(12) United States Patent
Myers et al.

(10) Patent No.: US 12,440,156 B2
(45) Date of Patent: Oct. 14, 2025

(54) GARMENT WITH ELECTROCARDIOGRAM ELECTRODES

(71) Applicant: Murata Vios, Inc., Woodbury, MN (US)

(72) Inventors: Ray V. Myers, Woodbury, MN (US); Brandon J. Laplante, Woodbury, MN (US); Scott T. Mazar, Woodbury, MN (US)

(73) Assignee: MURATA VIOS, INC., Woodbury, MN (US)

( * ) Notice: Subject to any disclaimer, the term of this patent is extended or adjusted under 35 U.S.C. 154(b) by 1265 days.

(21) Appl. No.: 16/845,114

(22) Filed: Apr. 10, 2020

(65) Prior Publication Data

US 2021/0059605 A1 Mar. 4, 2021

Related U.S. Application Data

(60) Provisional application No. 62/893,347, filed on Aug. 29, 2019.

(51) Int. Cl.
*A61B 5/00* (2006.01)
*A41D 1/00* (2018.01)
*A41D 1/04* (2006.01)
*A61B 5/0245* (2006.01)
*A61B 5/256* (2021.01)
(Continued)

(52) U.S. Cl.
CPC ............ *A61B 5/6805* (2013.01); *A41D 1/005* (2013.01); *A41D 1/04* (2013.01); *A61B 5/282* (2021.01); *A61B 2562/0209* (2013.01)

(58) Field of Classification Search
CPC .................. A61B 5/6805; A61B 5/282; A61B 2562/0209; A61B 5/0245; A61B 5/256; A61B 5/27; A61B 5/6831; A61B 2562/046; A61B 5/055; A61B 5/24; A61B 5/274; A61B 5/702; A61B 6/0421; A61B 17/00234; A61B 17/0401; A61B 5/0093; A61B 5/05; A61B 5/0002; A61B 5/0013; A61B 5/01; A61B 5/02438; A61B 5/0531; A41D 1/005; A41D 1/04; A41D 13/1281; A61N 1/0484; A61N 1/36034; A61N 1/0452; A61N 1/0492; A61N 1/24; A61N 1/321; A61N 1/36003; A61N 1/36007; A61N 1/3787; A61N 7/00; A61N 5/00; A61N 2007/0004; A61N 2007/0047; A61N 2007/006; A61N 2007/0078;
(Continued)

(56) References Cited

U.S. PATENT DOCUMENTS 6,070,269 A * 6/2000 Tardif ..................... G06F 3/011
2/912
2003/0135127 A1* 7/2003 Sackner ............... A61B 5/0535
600/536

(Continued)

*Primary Examiner* — Carl H Layno
*Assistant Examiner* — Anh-Khoa D Dinh
(74) *Attorney, Agent, or Firm* — Keating & Bennett, LLP

(57) ABSTRACT

A garment includes an outer shell, first and second electrode snaps located on an outer surface of the outer shell, first and second conductive rubber electrodes located inside the outer shell, a first conductive fabric strip connected to the first electrode snap and the first conductive rubber electrode, and a second conductive fabric strip connected to the second electrode snap and the second conductive rubber electrode.

12 Claims, 33 Drawing Sheets

(51) Int. Cl.
*A61B 5/27* (2021.01)
*A61B 5/282* (2021.01)
*A61D 1/00* (2006.01)
*A61D 1/04* (2006.01)

(58) Field of Classification Search
CPC .... A61N 2007/0095; A61N 7/02; H05C 1/06; G01D 11/24
See application file for complete search history.

(56) References Cited

U.S. PATENT DOCUMENTS

| | | | | |
|---|---|---|---|---|
| 2005/0283061 | A1* | 12/2005 | Ryu | A61B 5/303 600/372 |
| 2007/0226871 | A1* | 10/2007 | Hood | A41D 13/0012 2/69 |
| 2015/0366504 | A1* | 12/2015 | Connor | A61B 5/6804 600/301 |
| 2016/0338415 | A1* | 11/2016 | Aihara | A41D 27/285 |
| 2018/0035908 | A1* | 2/2018 | Wei | A61B 5/6805 |

* cited by examiner

Backing Piece

Front Guard

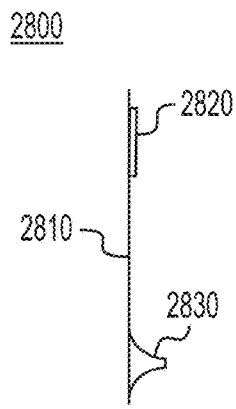
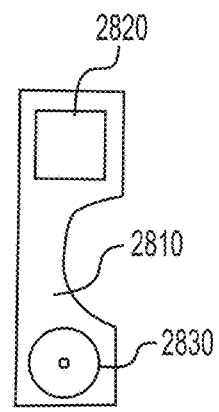
FIG. 28A  FIG. 28B
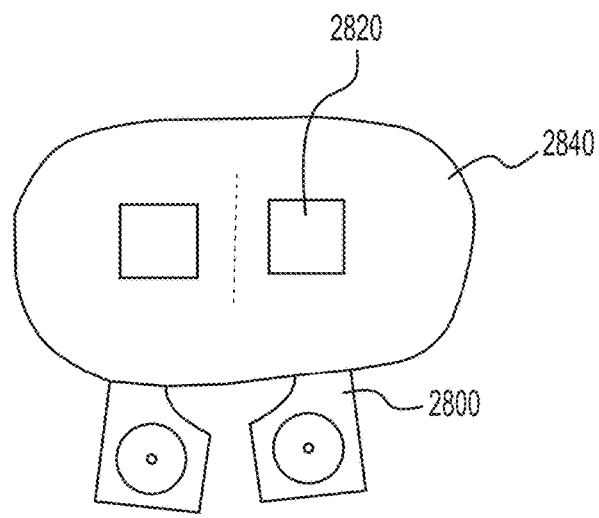
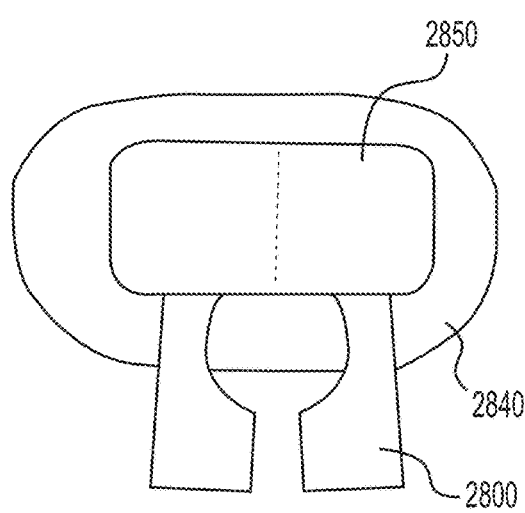
FIG. 29A  FIG. 29B

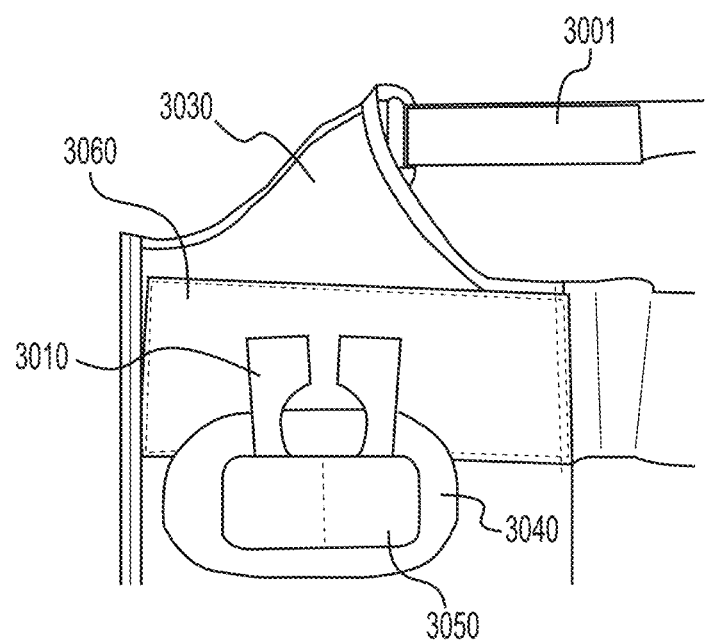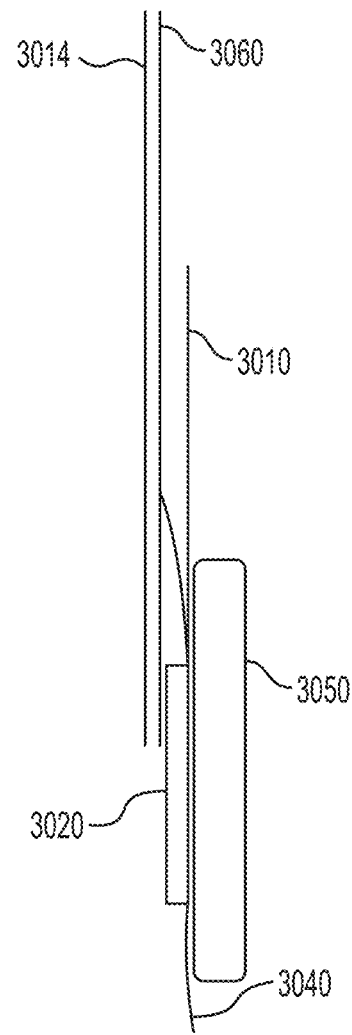
FIG. 30

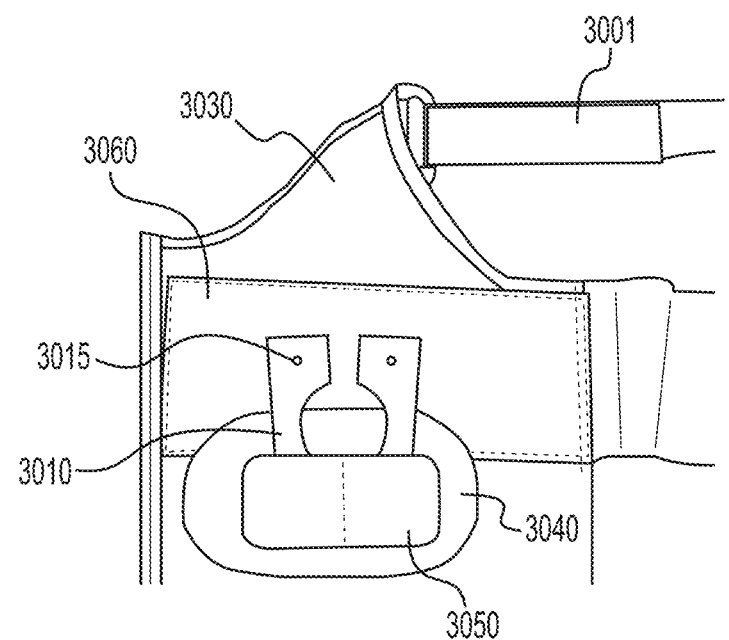
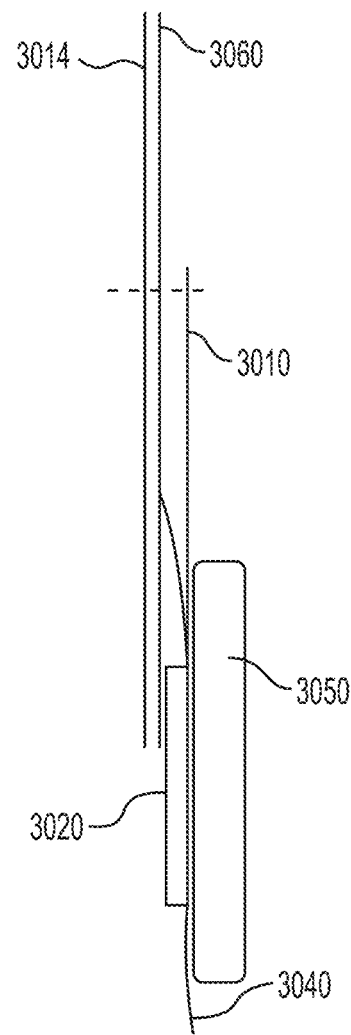
FIG. 31

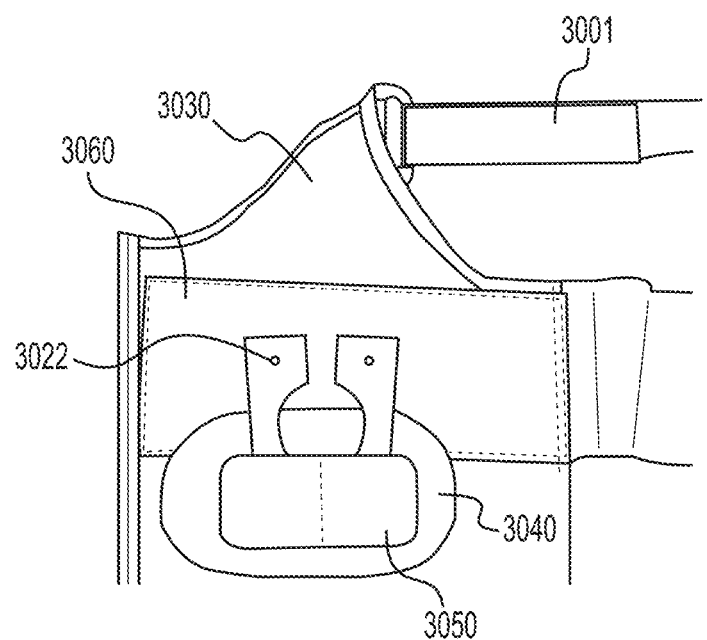
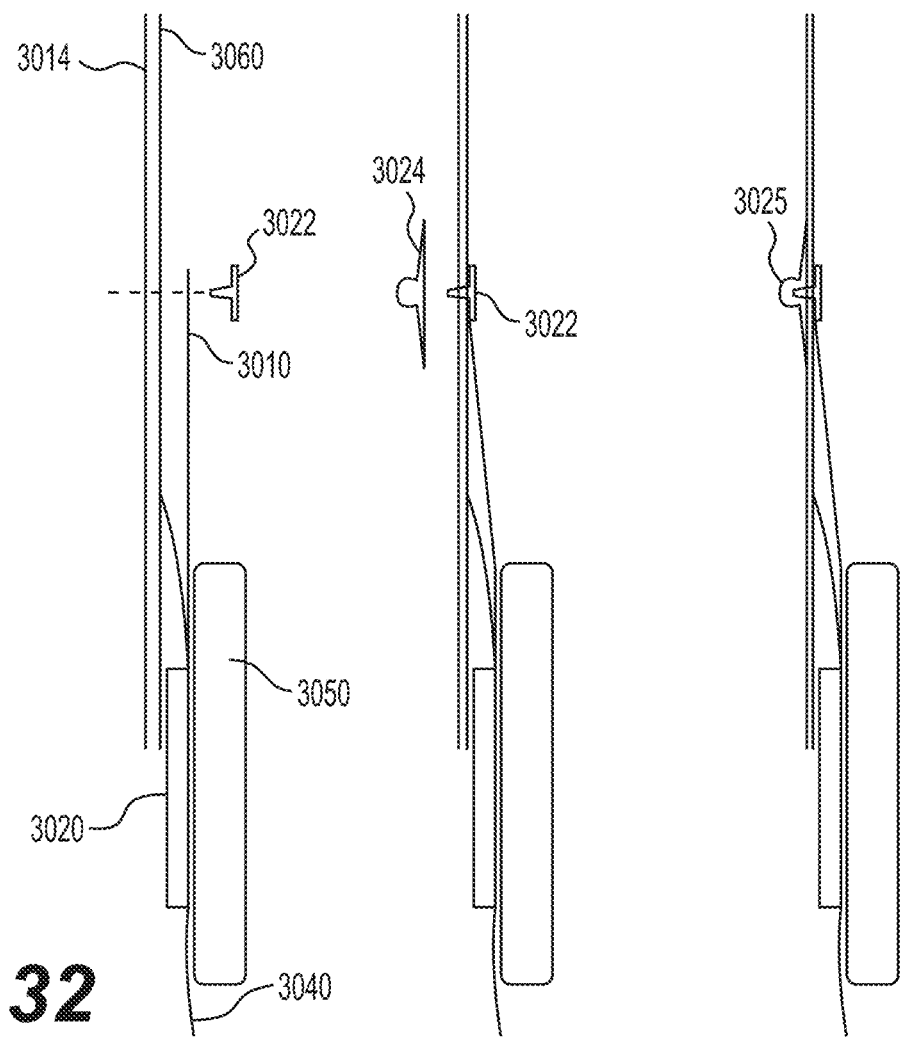
FIG. 32

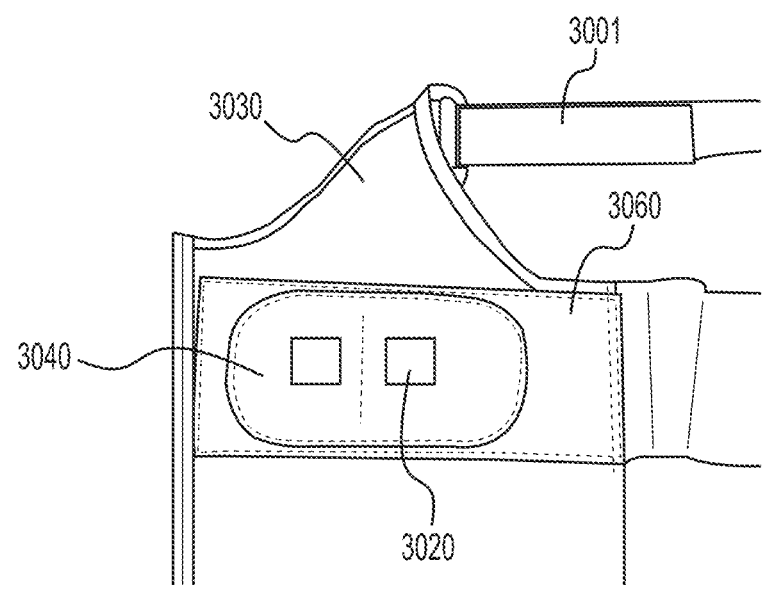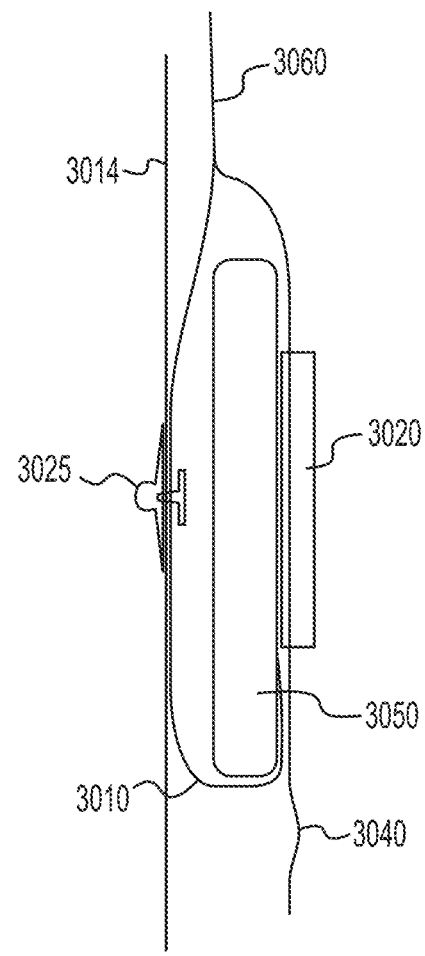
FIG. 33

GARMENT WITH ELECTROCARDIOGRAM ELECTRODES

BACKGROUND OF THE INVENTION

1. Field of the Invention

The present invention relates to electrocardiogram (ECG) electrodes and more specifically to a garment that is worn by a user that includes ECG electrodes.

2. Background

Wireless technologies make it possible to monitor and/or diagnose patients from locations other than a hospital or clinical setting. There are benefits to both the patient and the clinician to allow the patient to be monitored and to recover at home versus in a hospital. However, issues can arise when sending patients home with a personal monitoring device. These issues include patient noncompliance, patient/caregiver inability to correctly apply the device, sensitivity of the patient's skin to adhesives, and deterioration of the monitoring signal due to patient body movement.

Solutions that allow remotely monitoring a patient's vital signs exist in garment and hardware forms. Currently most garment-based solutions are used only for athletes or fitness enthusiasts interested in monitoring vital signs, as the signals these solutions produce are not of high enough quality to allow medical diagnosis.

Master Caution® from HealthWatch is a garment-based solution that claims to have a diagnostic-quality signal. Electrodes are integrated into the garment by knitting, and traces lead to a wireless monitor sensor attached to the garment at the patient's side. The Master Caution® is a tightly-fitted, stretchy garment that uses compression force to maintain contact between the knitted electrode patches and the patient's skin. However, because the electrode patches are inflexibly attached to the garment, the electrode patches slide across the skin surface during patient movement. To minimize this problem, the electrodes can be placed in areas of the body where the skin will move less during movement. However, it was found that a non-traditional placement of the electrodes will affect the ECG waveforms to the point that a clinician may need to be specially re-trained to interpret the ECG waveforms, or that an artificial intelligence (AI) software application may need to be developed to perform such interpretations.

An additional issue specific to a garment-based solution is the wide variety of patient body types, shapes, and proportions that need to be accommodated. To work properly, the garment must fit snugly, but not so snugly that the garment restricts movement or blood flow, or the patient experiences discomfort.

There are many more options available for hardware-based monitoring solutions. The Stasis Monitor from Stasis Labs and the MIRCaM from Cardiac Design Labs are Holter-type monitors, where sticky electrodes are connected by wires to a recording sensor. Issues with these types of monitors are many in that patients are expected to be able to correctly place all pieces of the monitoring system on themselves, the adhesives on the electrodes can cause skin irritation, perspiration and movement can cause the electrodes to fall off of the skin, and patients have stated that the equipment made them feel "tethered to, not freed by, technology."

Other hardware solutions solve several of these issues by changing the location of the electrodes so that the solution can be made more compact, eliminating the need for wires to connect electrodes to an external sensor or recording device. Some examples include Cicer from Ten3T Healthcare, the Heartsense® monitor from Cambridge Heartwear, and the Cardea Solo™ from Cardiac Insight. However, these examples still require adhesive to be used, can be placed incorrectly on the body, and also produce a non-traditional ECG waveform that has to be interpreted.

SUMMARY OF THE INVENTION

To overcome the problems and to satisfy the needs described above, a preferred embodiment of the present invention provides a garment with electrodes that can move linearly and rotationally relative to the garment and that are connected to an external sensor by wires that are contained in channels or pockets of the garment. When worn by a user and when the electrodes are attached to the user's skin, the garment can move with the user's movement but can allow the electrodes to move linearly and rotationally with respect to the garment such that the electrodes remain attached to the user's skin. By allowing the electrodes to remain attached to the user's skin, even when the patient is moving, the electrodes can provide diagnostic-quality signals.

A stretch vest with holes in a lining can hold suspended electrodes against the body by pressure, where the electrodes are able to move and rotate independently of the garment in an x-y plane of a constrained area defined by the patient's skin.

Alternatively, a stretch vest with an inner system of elastic straps can hold fabric patches including electrodes tightly against a patient's skin. On the patches, the area surrounding each electrode is made of a material that grips the skin, allowing the patch to move with the skin without the use of traditional gels or adhesives, but with the use of conductive or electrolyte gel.

To reduce the chance of the ECG monitoring device being applied incorrectly, e.g. upside-down or backwards, a garment can be a familiar type of garment, such as a vest. Signifiers, such as shoulder straps and a front zipper, make the correct orientation of the garment readily apparent to the patient. Holes in the vest lining, or electrode patches, are placed such that the electrodes are held in the correct position to allow application of ECG lead wires as the garment is donned and worn.

Traditional adhesives between the electrodes and patient's skin may not be necessary. In the garment with holes, the combination of gentle pressure from a tightly-fitted lining and the tackiness of soft silicone surrounding the electrode can ensure the electrodes maintain contact with a patient's skin and do not slide across it. Alternatively, the garment with elastic straps can hold electrode patches tightly against the body, and a material that grips the skin will keep the electrode patches from sliding. Not using traditional adhesives is beneficial to patient's with sensitivities to such traditional adhesives.

Because patients may have limited fine motor skills either permanently or during recovery, the zipper mechanism has a pull that is large enough to grip easily, and zipper helpers or tabs on either side of the pin and barrel of the zipper that the patient can hold onto while guiding the pin into the barrel, make it possible to use a zipper without excessive pinching force on the hands. A full-length front zipper can be used to permit the vest garment to be opened fully so the vest garment can be easily put on and taken off. This zipper placement means that electrode wires cannot continuously run across the front torso and must instead be run around the patient's back.

The outer body fabric of the garment can be a nylon-spandex blend knit that can be treated with an antimicrobial finish to reduce the buildup of odors on the garment, even with prolonged wear. This outer fabric is slippery to allow sliding of the garment over the electrodes or electrode patches. Patients can also wear the garment underneath their everyday clothing, and the slippery fabric will allow it to be less visible by eliminating wrinkles caused by the clothing fabric sticking to the garment.

In the garment with holes, the inner lining can be made of a soft cotton rib knit that can be treated with an antimicrobial finish. Because of the mechanics of the rib knit, this fabric will stretch at least 100% to accommodate the widest size range possible, while feeling soft and comfortable against the patient. In the garment with elastic straps, the straps holding the electrode patches can be made of a plush elastic to reduce skin chafing and to minimize patient discomfort.

Through stretch and adjustability, a garment for a specific chest size will accommodate a range of shoulder and waist sizes.

Rather than moving electrodes to a location where the electrodes would be less disturbed during patient movement, the traditional placement of electrodes produces a traditional wave form so that doctors do not need to be re-trained and so that AI software does not need to be developed to interpret non-traditional waveforms.

A garment according to a preferred embodiment of the present invention includes a lining with a hole, a lead in the hole, and a wire connecting the lead to a sensor, wherein the lead is able to move in an x-y direction and rotate within the hole.

The garment can further include another hole adjacent to the sensor and a channel that is located between the hole and the another hole, wherein the wire extends through the channel. The garment can further include a zipper that extends from a top to a bottom at a front of the garment, wherein the zipper can include first and second pull tabs located on opposite sides of a bottom of the zipper, and the first and second pull tabs can each include plastic and fabric swatches. The garment can further include a cutout at a rear of the garment and an adjustment area under the cutout and above a bottom hem line of the garment used to adjust garment fit at a waist area of the garment. The garment can further include a cutout at a chest area adjacent to a top portion of a front zipper and a cutout at a waist area. The lead can transmit a signal from a body of a user wearing the garment. The signal can be an electrocardiogram (ECG) signal. The garment can further include additional leads, wherein the additional leads and the lead can be arranged such that some of the additional leads and the lead are located at a chest area of the garment and some of the additional leads and the lead are located at a waist area of the garment.

A lead for a garment according to a preferred embodiment of the present invention includes a backing piece, a back cap attached to a rear of the backing piece, a snap-on electrode attached to a front of the backing piece that contacts a body of a user wearing the garment, and a front guard attached to a front of the backing piece behind the snap-on electrode, wherein the snap-on electrode includes a transducer that changes pulsating electrical waves from a body of a user wearing the garment into an electrical signal.

The backing piece can include a stem that is hollow, a back guard attached to a rear of the stem, and a front center that is smaller in area than the back guard. The lead can further include a snap attached to a front of the front center and electrically connected to a wire that extends through the stem, wherein the snap-on electrode is attached to the snap. The front center can fit through a hole in a lining of the garment in which the back guard does not fit through, and the lead can be free to move independently relative to the garment. The snap-on electrode can be rotatable or movable relative to the snap.

A garment according to a preferred embodiment of the present invention includes an outer shell, an elastic strap held to the outer shell with fabric loops, an electrode attached to the elastic strap, and a wire connecting the electrode to a sensor, wherein the electrode is able to move relative to the outer shell.

The garment can include a zipper that extends from a top to a bottom at a front of the garment, wherein the zipper can include first and second pull tabs located on opposite sides of a bottom of the zipper, and the first and second pull tabs can each include plastic and fabric swatches. The garment can further include a pocket in which the wire is routed. The garment can further include a zipper that extends from a top to a bottom at a front of the garment, wherein the zipper can include first and second pull tabs located on opposite sides of a bottom of the zipper, and the first and second pull tabs can each include plastic and fabric swatches. The garment can further include a cutout at a rear of the garment and an adjustment area under the cutout and above a bottom hem line of the garment used to adjust garment fit at a waist area of the garment. The garment can further include a cutout at a chest area adjacent to a top portion of a front zipper and a cutout at a waist area. The electrode can transmit a signal from a body of a user wearing the garment. The signal can be an electrocardiogram (ECG) signal. The garment can further include additional electrodes, wherein the additional electrodes and the electrode can be arranged such that some of the additional electrodes and the electrode are located at a chest area of the garment and some of the additional electrodes and the electrode are located at a waist area of the garment.

An electrode patch for a garment according to a preferred embodiment of the present invention includes an antistatic fabric, a conductive fabric, a conductive rubber piece electrically attached to the conductive fabric, an electrically conductive fastener that attaches a wire to the conductive fabric, a grip fabric surrounding the conductive rubber piece to keep the conductive rubber piece from sliding across skin of a body of a user wearing the garment, and a cover fabric attached to a front of the antistatic fabric and the conductive rubber piece to hide the fastener, wherein the conductive fabric includes a transducer that changes pulsating electrical waves from the body of a user into an electrical signal.

A garment according to a preferred embodiment of the present invention includes an outer shell, an elastic strap held to the outer shell with fabric loops, and the electrode according to various other preferred embodiments of the present invention attached to the elastic strap. The wire connects the electrode to a sensor, and the electrode is able to move relative to the outer shell.

A garment according to a preferred embodiment does not include any internal wiring. The lack of internal wiring results in a less expensive and more robust garment that can be repeatedly washed with no damage. The garment includes covers to protect externally mounted wires and to mitigate the risk of the wires being pulled, damaged, or disconnected from the electrodes during use. The garment can be used with an external monitoring system including existing monitoring system products. Thus, the garment according to this preferred embodiment can be used with patients who are performing limited physical activity or are resting during recovery. For example, the garment with the external monitoring system can be used with patients doing computer work, reading, and walking around the house.

A garment according to a preferred embodiment of the present invention includes an outer shell, first and second electrode snaps located on an outer surface of the outer shell, first and second conductive rubber electrodes located inside the outer shell, a first conductive fabric strip connected to the first electrode snap and the first conductive rubber electrode, and a second conductive fabric strip connected to the second electrode snap and the second conductive rubber electrode.

The garment can further include a bump fabric connected to an inside surface of the outer shell, wherein the first and the second conductive rubber electrodes preferably extend through corresponding holes in the bump fabric. The garment can further include a filler located between the outer shell and the bump fabric. The garment can further include a sensor holder and a monitoring system that is held by the sensor holder and that is directly attached to the first and the second electrode snaps. The garment can further include third and fourth electrode snaps, wherein the monitoring system can include a first lead wire connected to the third and the fourth electrode snaps. The garment can further include fifth and sixth electrode snaps, wherein the monitoring system can include a second lead wire connected to the fifth and the sixth electrode snaps.

The garment can further include a monitoring system that is held by the sensor holder and that includes a lead wire, wherein the lead wire can be directly attached to the first and the second electrode snaps.

The garment can further include a size-adjusting band.

An electrode for a garment according to a preferred embodiment of the present invention includes a conductive fabric, a conductive rubber patch attached to and electrically connected to the conductive fabric, and a lead snap attached to and electrically connected to the conductive fabric. The conductive rubber patch conducts pulsating electrical waves from a body of a user wearing the garment to the lead snap.

The electrode can further include a bump fabric and a filler, wherein the conductive fabric can be located between the bump fabric and the filler.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIGS. 28A and 28B show a conductive rubber electrode.

FIGS. 29A and 29B show the conductive rubber electrode of FIG. 28A attached to a bump fabric and a filler.

FIGS. 30-33 show a method of attaching conductive rubber electrodes to a garment.

DETAILED DESCRIPTION OF PREFERRED EMBODIMENTS

Figure 1:
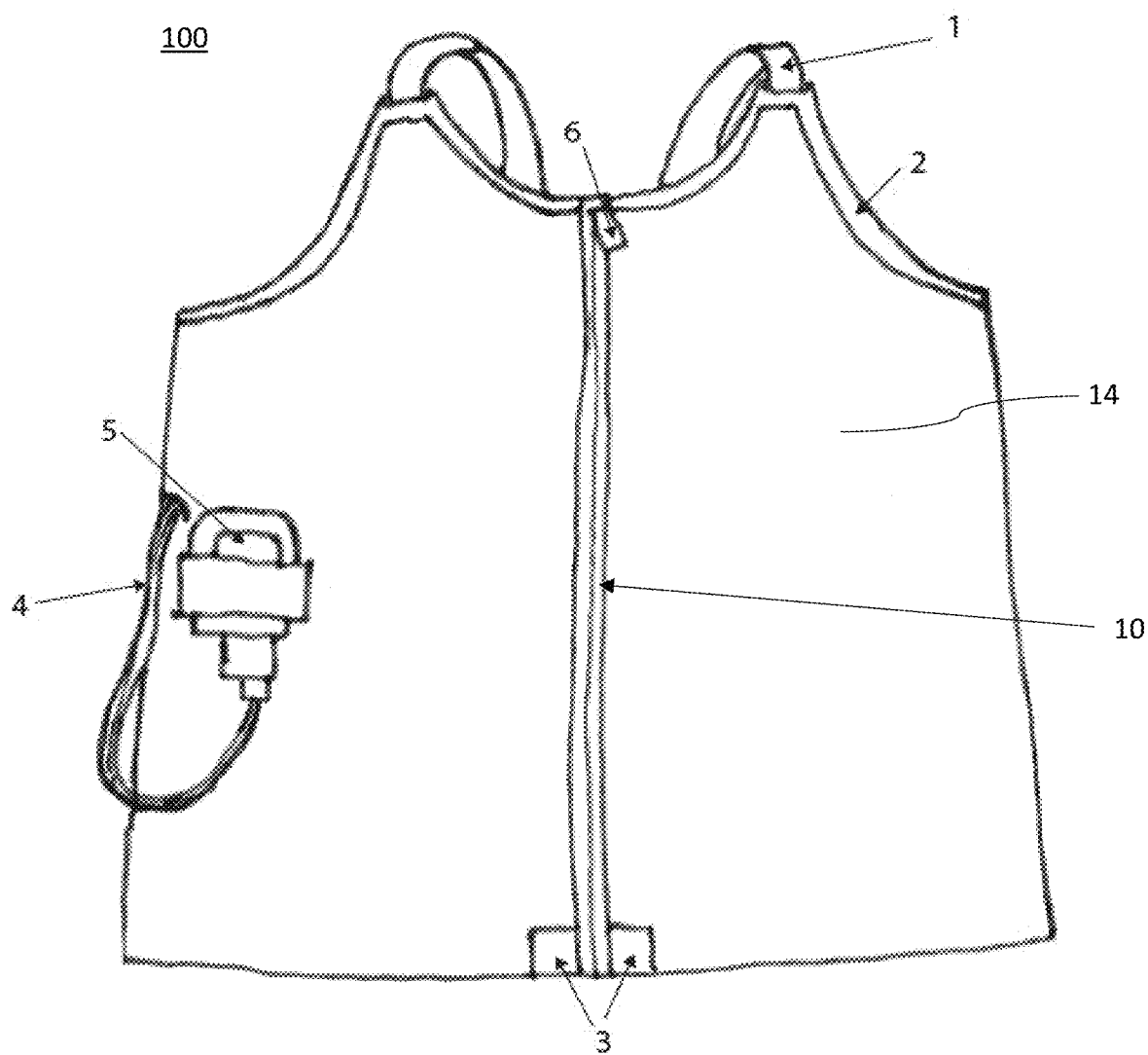
FIG. 1 shows a front view of a garment monitoring device with holes according to a first preferred embodiment of the present invention.

FIG. 1 shows a front view of the outside of a garment 100 according to a first preferred embodiment of the present invention. The garment 100 in FIG. 1 is shown as a vest, but other types of garments can also be provided in other preferred embodiments of the present invention. For example, the garment could also include sleeves. FIG. 1 shows that the garment 100 includes an outer shell 14 that covers a lining (not shown in FIG. 1 but shown in FIG. 2). The fabric of the outer shell 14 can be a nylon-spandex blend knit that can be treated with an antimicrobial finish to reduce the buildup of odors on the garment 100, even with prolonged wear. The fabric of the outer shell 14 can be slippery to encourage sliding of the outer shell 14 over a lining with electrodes or patches. Additionally, patients will also often wear the garment 100 underneath their everyday clothing, and the slippery external fabric of the outer shell 14 will enable the garment 100 to be less visible by minimizing wrinkles.

FIG. 1 also shows two adjustable shoulder straps 1 that fit over the shoulders of the patient and used to adjust fit. As shown in FIG. 1, the arm holes can be bound by a stretch binding 2 with a soft hardware loop, discussed with respect to FIG. 19. The shoulder straps 1 extend through the soft hardware loop. The garment 100 can be opened and closed in the front with a full-length zipper 10 that can include a silicone pull tab 6 and zipper helpers 3, which are discussed with respect to FIG. 18. FIG. 1 also shows wires 4 that are connected to interior lead and electrodes through a hole in the garment 100 and that are connected to a sensor 5.

The sensor 5 can include components, such as one or more processors, that can process signals received from a patient wearing the garment 100, and can include one or more communications modules to communicate with other computing devices using one or more communications protocols (e.g., Bluetooth, WiFi, cellular communication, etc.). Other components that can be included in sensor 5 are interface circuits to interface with an electronic device, such as one or more accelerometers, a GPS or other location detection circuit, temperature sensors to sense environmental temperature, light sensors to sense environmental light, and output circuits to output information to a user through the control of output devices such as lights, speakers, audible alarms, display screens, etc.

Although shown as being external to the garment 100 and to one side, the sensor 5 can be positioned in any suitable location. The sensor 5 can be removable to replace the sensor 5, to charge the sensor 5, etc. The sensor 5 can communicate wirelessly with a monitoring device to communicate information concerning the patient. For example, the sensor 5 can receive ECG or other suitable signals from the wires 4, which is then wirelessly communicated to the monitoring device. The monitoring device can then transmit signals to a remote monitoring location. The transmitted signals can be the signals sent by the sensor 5 or can be processed signals. The monitoring device can continuously or intermittently transmit signals. The monitoring device can send signals at any regular or irregular interval. For example, the monitoring device can send signals every minute, every five minutes, every hour, etc. or can send signals when a significant event is detected.

Figure 2:
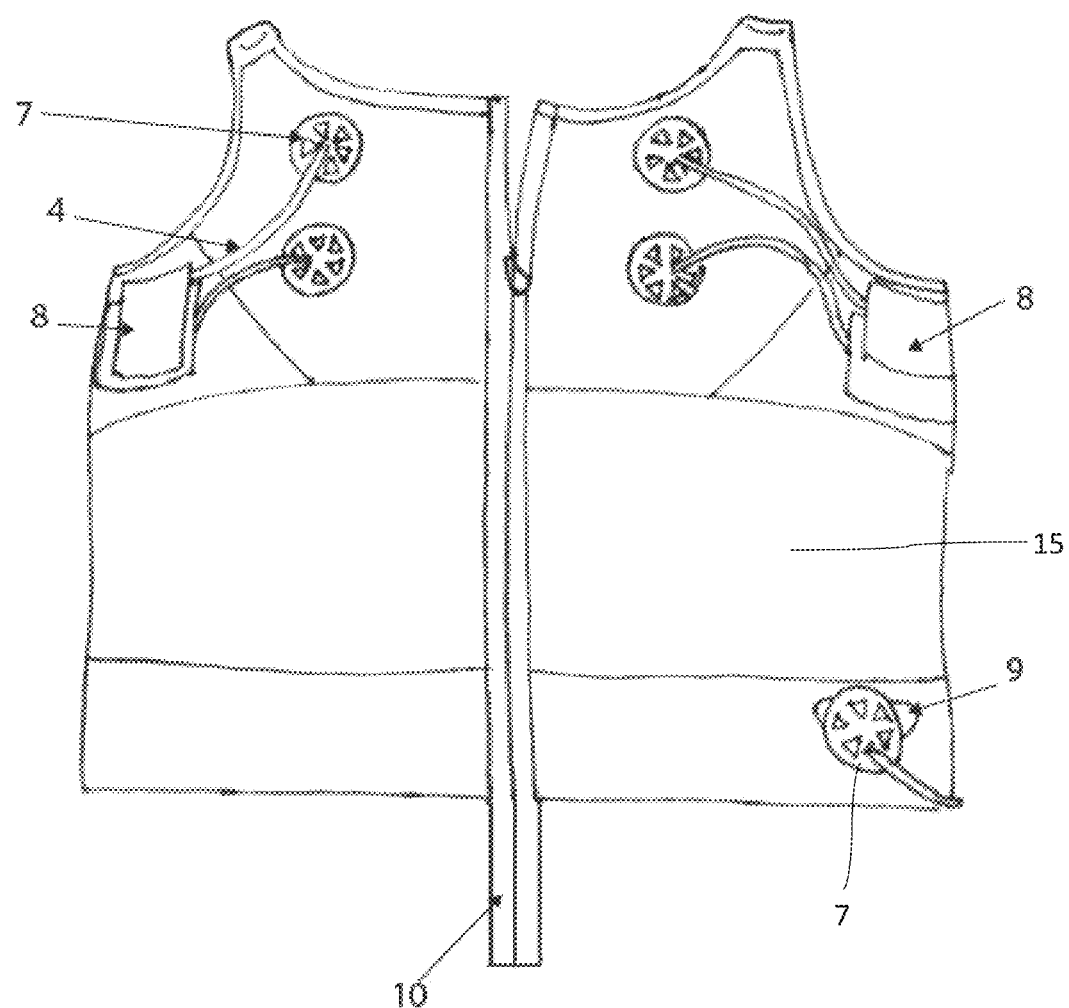
FIG. 2 shows a front view of a lining for the garment monitoring device of FIG. 1.

FIG. 2 shows a front view of an inner lining 15 of the garment 100 of FIG. 1 with the outer shell 14 removed. The outer shell 14 can be attached to the lining at the neckline and armholes only, with the stretch binding covering the two layers together. The inner lining 15 can be made of a soft cotton rib knit that can be treated with an antimicrobial finish. Because of the mechanics of the rib knit, this fabric will stretch at least 100% to accommodate the widest size range possible, while feeling soft and comfortable against the patient's skin. Through stretch and adjustability, a garment 100 for a specific chest size will accommodate a range of shoulder sizes and waist sizes where the waist area is the most stretchable portion of the garment 100. Shoulder size is adjustable by straps 1, shown in FIG. 1, that extend from the back and that thread through a soft hardware loop on the front. The straps 1 can be set to the desired length by fastening with a hook-and-loop system, buttons, snaps, hooks, or any other suitable method. Any additional garments 100 provided to the patient can be set to the same size and/or marking before leaving the hospital or clinical setting.

The inner lining 15 is open and closed with the zipper 10. The inner lining 15 also includes five leads 7, with two leads 7 located each on either side of the chest and one lead 7 located on the lower left side. Any number and location of leads 7 are possible. The leads 7 are connected via wires 4 that are routed through channels 8 to the sensor 5 shown in FIG. 1. As shown, the three left-side wires 4 travel across the back and are looped, or otherwise arranged to ensure slack at the center back to allow stretching of the garment 100. The three left-side wires plus the two right-side wires 4 meet at a hole in the right front outer shell fabric and extend through to the outside of the garment 100, terminating in a connector at the sensor 5, which is retained in a holder or with another suitable mechanism. The channels 8 are used to route and conceal the wires 4 and are attached to the outside of the inner lining 15 and overlap each other to reduce the footprint of the channels 8, which are much wider than the wires 4 in order to allow the leads 7 to be pulled through them during assembly.

FIG. 2 also shows a hole 9 in the inner lining 15 in which a lead 7 is located. As seen, the hole 9 allows the leads 7 to move within the dimension of the hole 9 to allow the leads 7 to move independently from the garment 100 and with the patient's skin, rather than be constricted by the garment 100.

Figure 3:
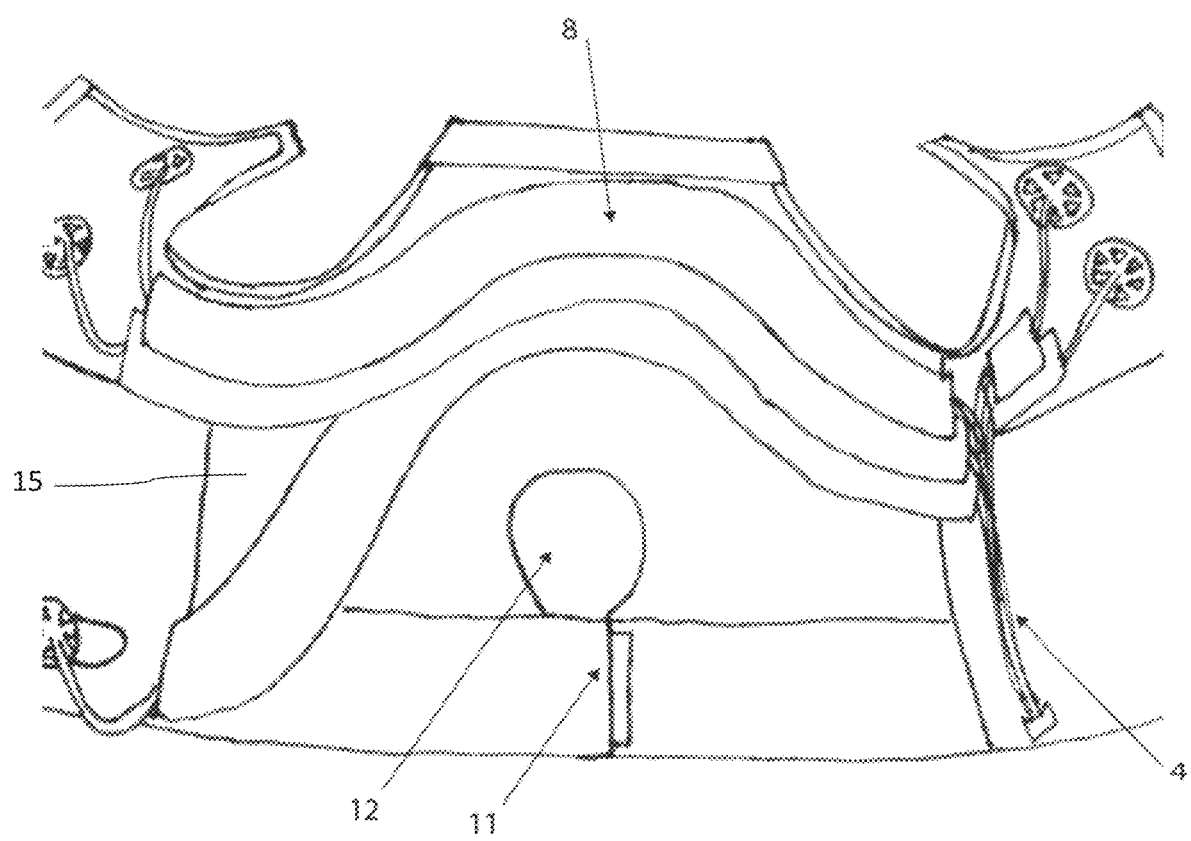
FIG. 3 shows a rear view of a lining for the garment monitoring device of FIG. 1.

FIG. 3 shows a back view of the inner lining 15 with the inner lining 15 open. FIG. 3 shows the channels 8 traversing across the rear of the inner lining 15 with wires 4 routed to the right side to connect to the sensor 5. The inner lining 15 also has a cutout 12 at the bottom center back and below that is a tab 11 with a hook-and-loop fastener that can be used for adjustment. This feature allows the high hip area to be loosened or tightened as needed to get a proper fit and connection for the hip lead. As with the shoulder straps 1, a marking can be noted and any additional garments 100 can be set to the same size before being provided to the patient.

Figure 4:
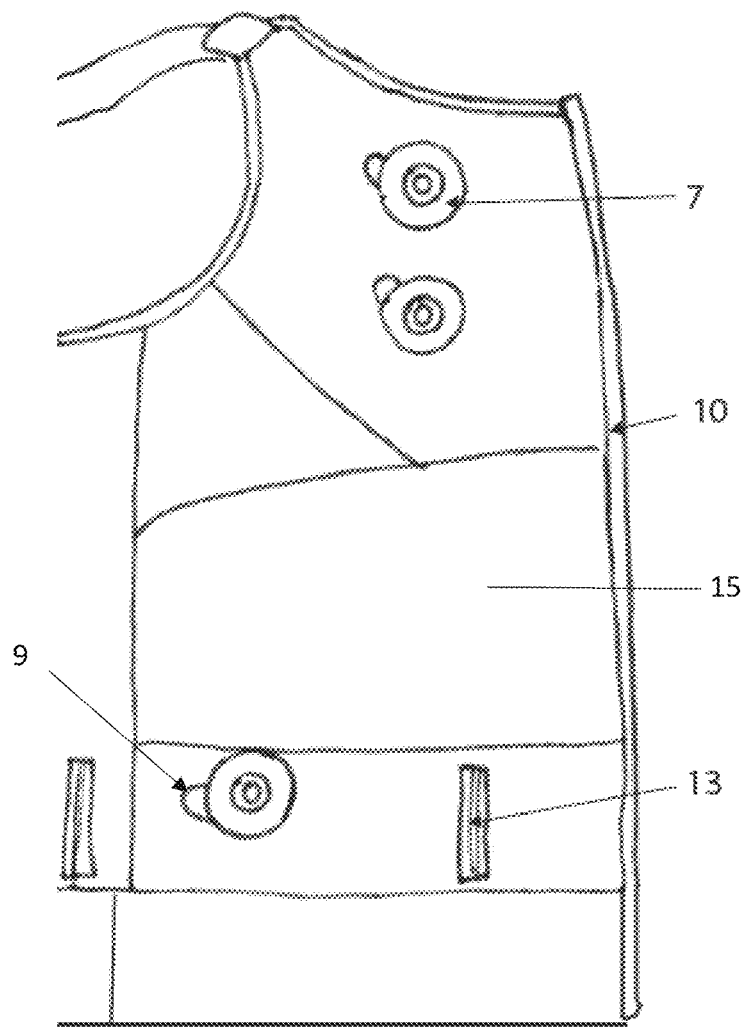
FIG. 4 shows a front inside view of a lining for the garment monitoring device of FIG. 1.

FIG. 4 is an inside view of the left side of the inner lining 15. This view shows the zipper 10, the leads 7 within the holes 9, and grip strips 13. The grip strips 13 are areas where a layer of silicone is applied to the inside of the lining 15 in order to grip the skin of a user wearing the garment 100. The grip strips 13 can be placed at the bottom hem of the lining 15 to keep the hem from riding up while the user is moving. The silicone could be applied directly to the fabric of lining 15, or an off-the-shelf product such as a non-slip elastic piece could be sewn on.

Figure 5:
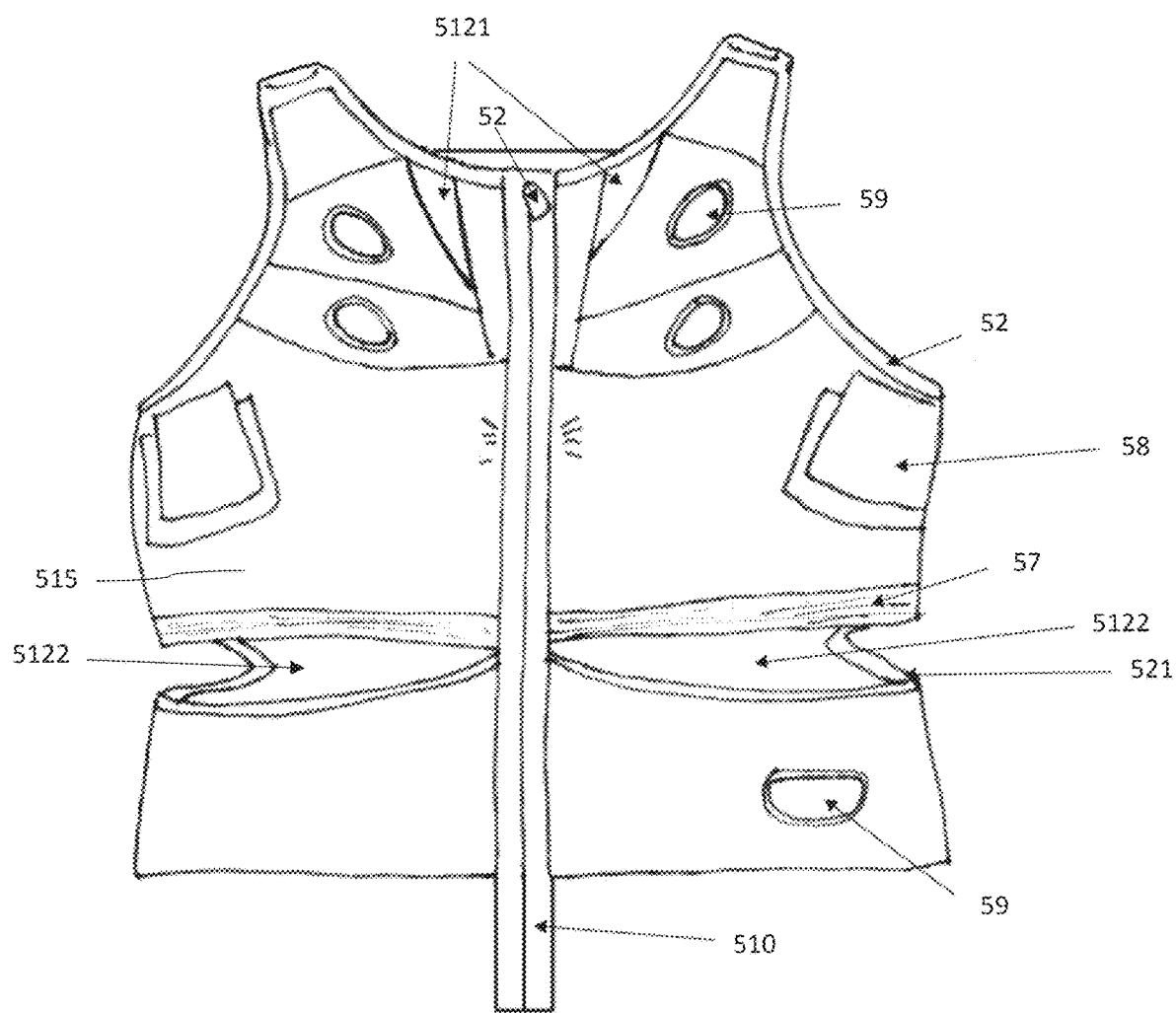
FIG. 5 shows a front view of a lining for a garment monitoring device with features for women.
Figure 6:
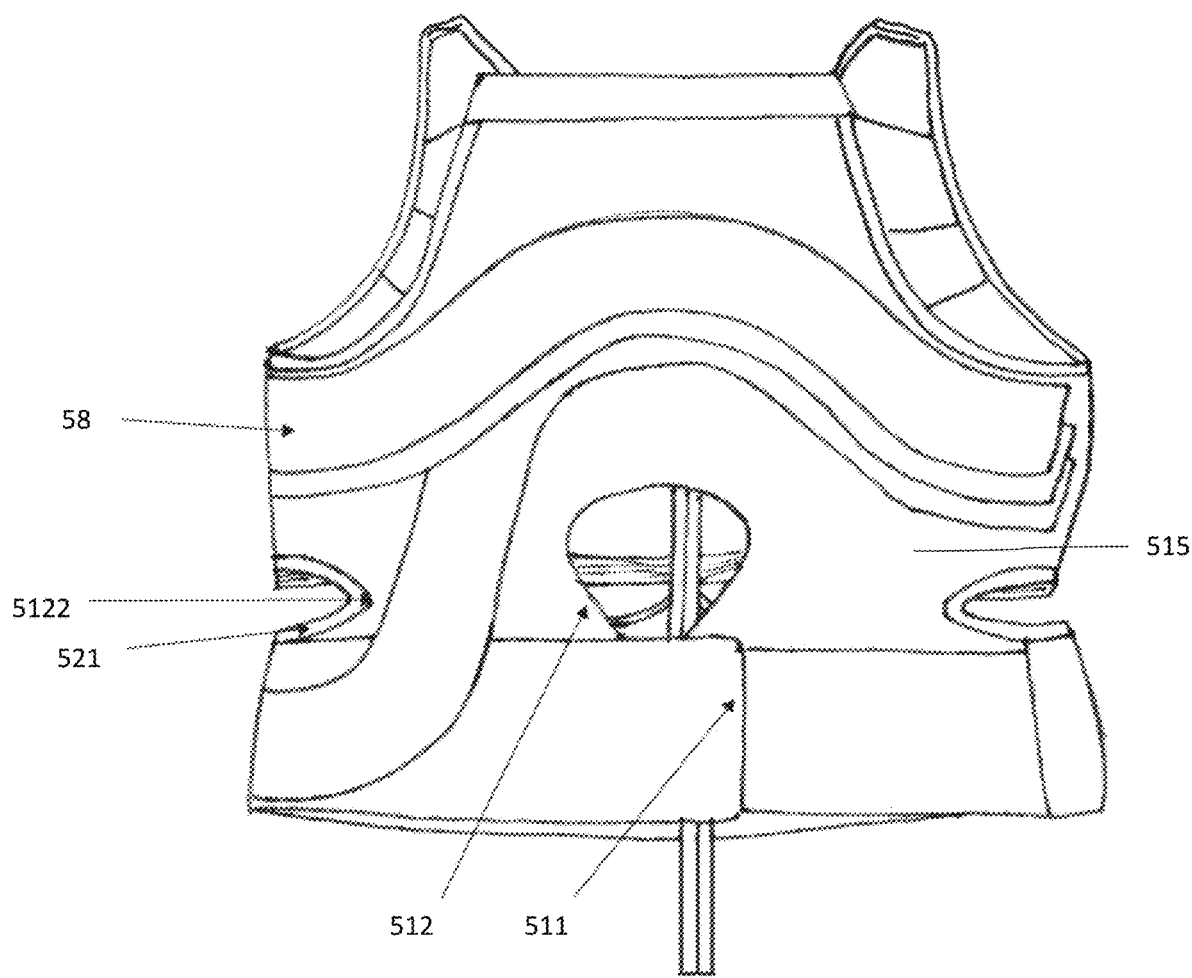
FIG. 6 shows a rear view of the garment lining of FIG. 5.
Figure 7:
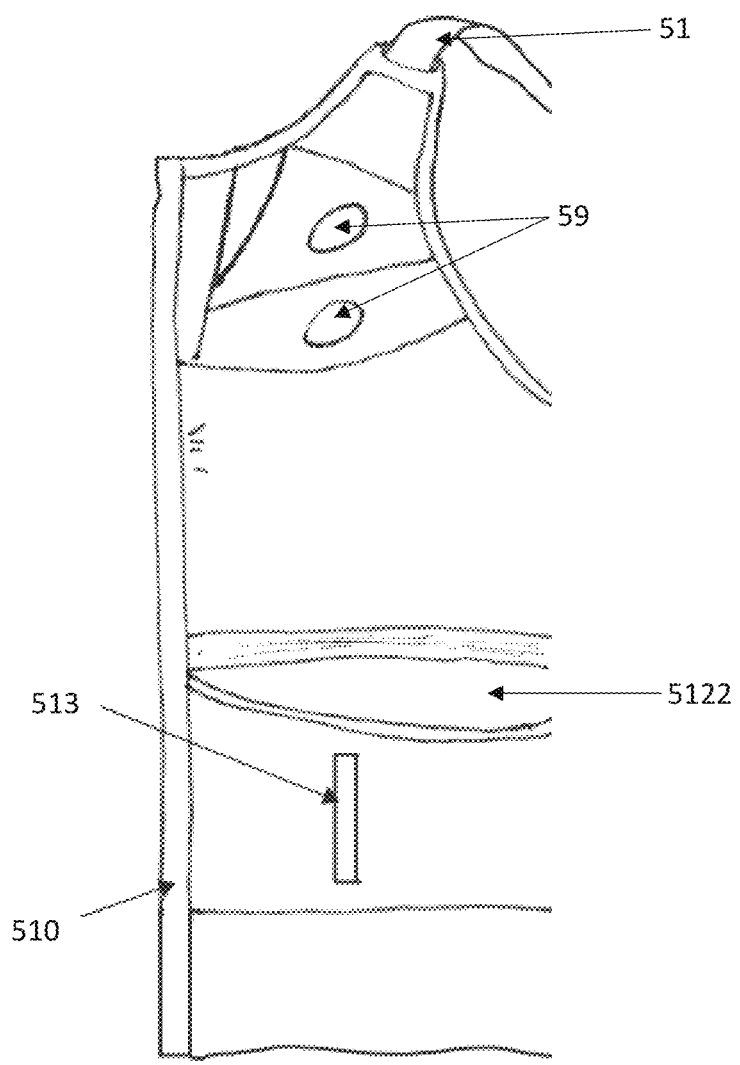
FIG. 7 shows a front inside view of the garment lining of FIG. 5.

FIGS. 5-7 show a version of an inner lining 515 of a garment with features that are included to specifically fit contours of women. Several features depicted are similar to those previously described with respect to FIGS. 1-4 and will not be repeated for brevity including the adjustable strap 51, the stretch binding 52 with soft hardware loop, the silicone pull tab 56, the channels 58, the holes 59, the zipper 510, the adjustable high hip 511, the rear cut out 512, and the grip strips 513.

FIG. 5 shows a front view of the inner lining 515 that includes neck-area cut outs 5121 and waist-area cutouts 5122. The neck-area cut outs 5121 can include one each on either side of the top portion of the inner lining 515 adjacent to the zipper 510 and can be generally V-shaped. Waist-area cut outs 5122 can include one each on either side of a mid-portion of the zipper 510 and extend around the sides of the inner lining 515. Additionally, elastic 57 can extend along the top side, and a stretch binding 521 can extend along the bottom side of the waist-area cut outs 5122 to hug the torso.

FIG. 6 is a rear view of the inner lining 515 that shows the waist-area cut outs 5122 and the stretch binding 521 extending around the sides, a rear cutout 512, and an adjustable high hip 511. FIG. 7 is an inside view of the right side of the inner lining 515 without leads present. This view shows the zipper 510, holes 59, a waist cut out 5122, and a grip strip 513.

Figure 8:
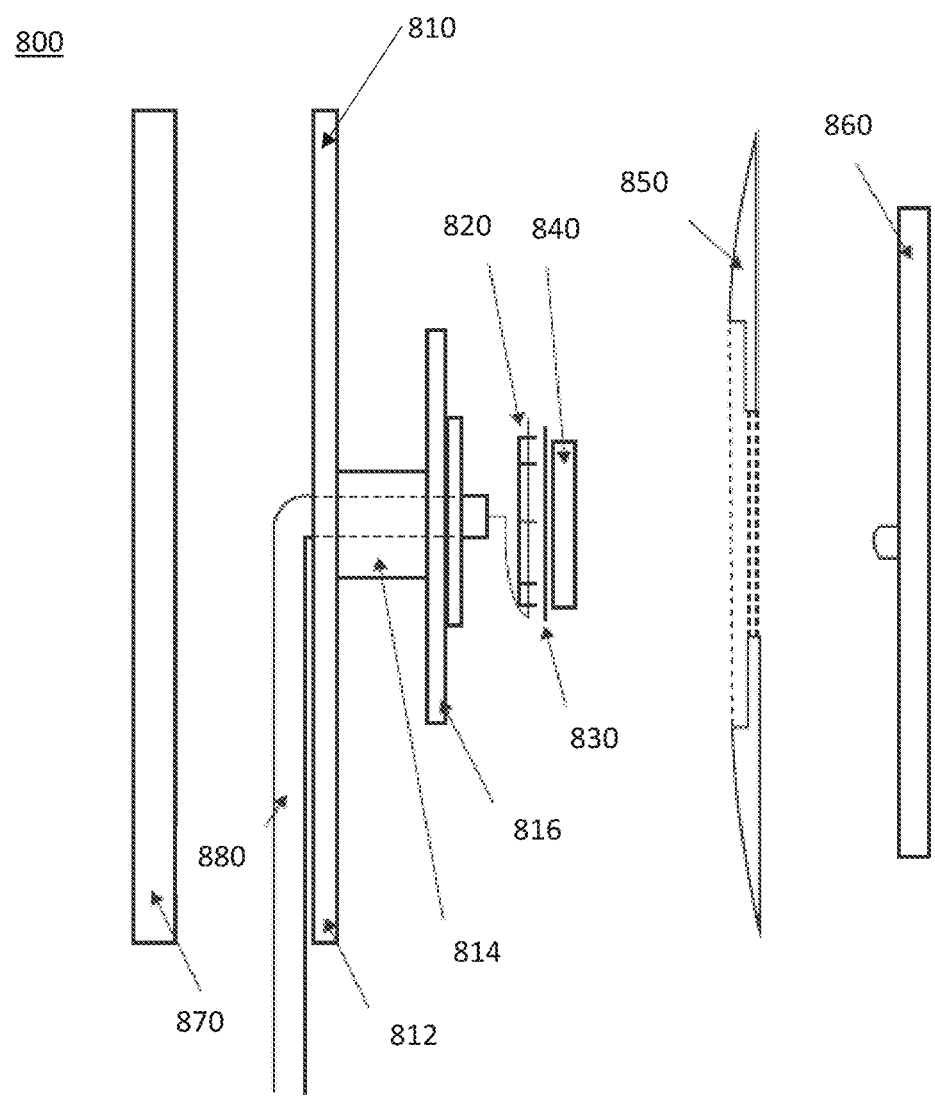
FIG. 8 shows an exploded view of a lead.

FIG. 8 is a side exploded view of a lead 800. As shown, the lead 800 can include four main components: a backing piece 810 including a back guard 812, a stem 814, and a front center 816; a back cap 870; a front guard 850; and a snap-on electrode 860. Stem 814 can be hollow to accommodate the wire 880.

Figure 9:
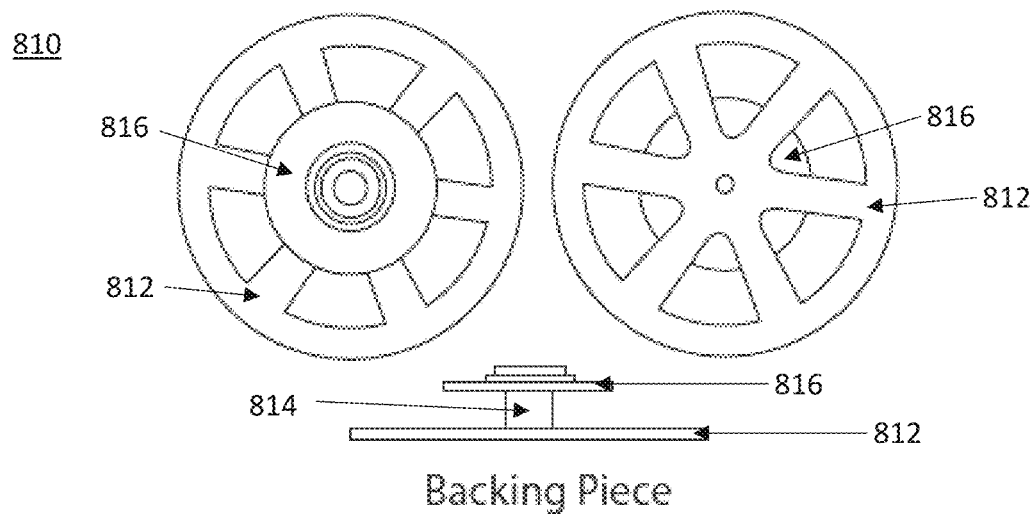
FIG. 9 shows a backing piece of a lead.

As shown in FIGS. 8 and 9, the backing piece 810 can include two flat-bottomed disks, the back guard 812 and the front center 816, that can be connected with the stem 814. A wire 880 travels from a connector on a sensor through a channel in the garment and into a hole in the center of the back guard 812, where the wire 880 travels through the stem 814 so the conductor protrudes from the front center 816, where the conductor is crimped in a snap 840 with the mating side of the snap 840 facing out. The snap 840 can be held in place to the front center 816 using a snap ring 820 with a buffer or filler fabric 830 in between.

The back cap 870 can be a flat, thin disk that is affixed to the back of the back guard 812, after the wire 880 has been threaded through the backing piece 810. This protects and contains the wire 880 and provides a smooth surface for garment fabric to slide over.

Figure 10:
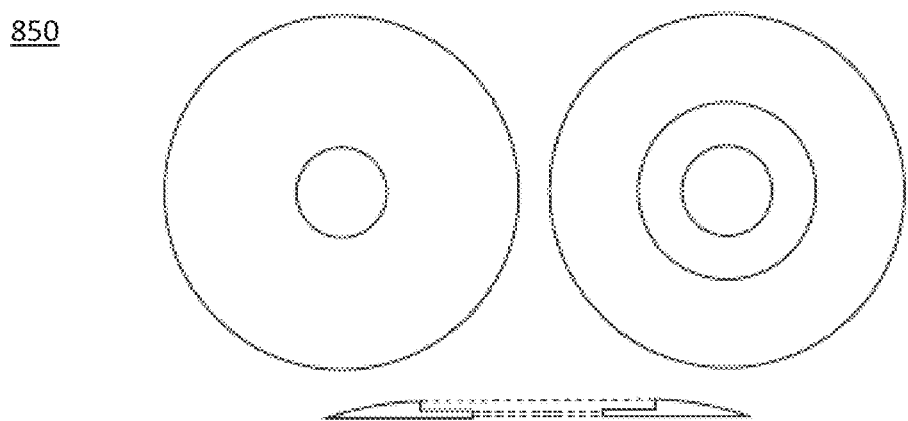
FIG. 10 shows a front guard of a lead.

As shown in FIGS. 8 and 10, the front guard 850 can be a flat, thin disk with a hole in the middle that fits onto and affixes to the front center 816. Because the face of the lead 800 does not completely cover the hole in all positions, the front guard 850 ensures that the lead 800 never gets stuck in the hole.

The snap-on electrode 860 can be made from a conductive material and can include a snap connector opposite to the snap 840, shown as a male connector that snaps into the female snap 840 on the front center 816. The snap-on electrode 860 is a transducer that changes pulsating electrical waves from the patient's body into an electrical signal that travels from the snap-on electrode 860 through the snap 840 to the wire 880 and then to the sensor. A snap rotary joint connection allows the face of the lead 800 (i.e., snap-on electrode 860) to spin independently of the rest of the components. The leads 800 can be suspended in holes in the garment that can be reinforced with plastic frames so the holes in the garment do not change shape when the garment stretches to allow constrained x-y movements, independent of the garment. The plastic-reinforced holes allow the leads 800 to move in an x-y plane defined by the opening of the hole. After the lead 800 is connected to a patient's skin and when a patient moves, the garment can move in the x-y direction with respect to the surface of the patient's skin without disconnecting or interfering with the electrode's 860 connection to the patient's skin.

It is possible to use other lead constructions so long as the lead is able to move and rotate within the hole in the garment to allow the lead to stay attached to the patient's skin, even when the patient moves.

Figure 11A:
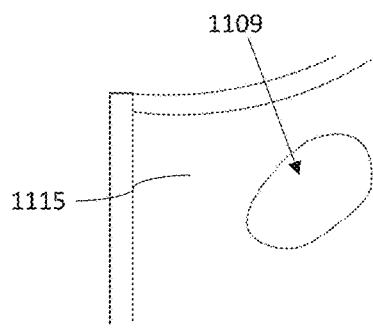
FIGS. 11A-11C show a front view of a process of installing a lead in a lining with holes.
Figure 11B:
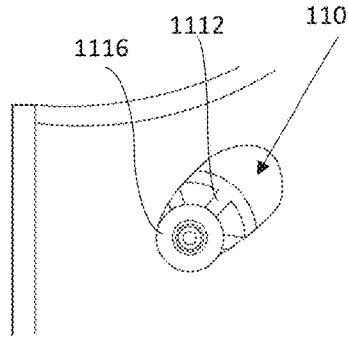
Figure 11C:
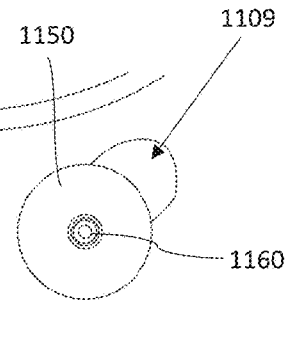
Figure 12A:
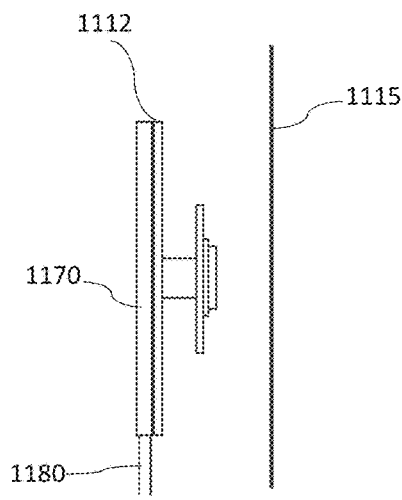
FIGS. 12A-12C show a side view of a process of installing a lead in a lining with holes.
Figure 12B:
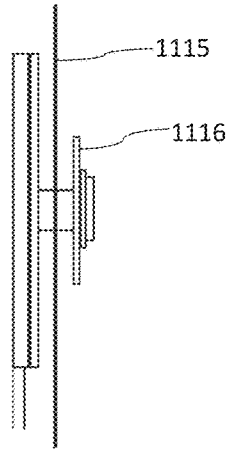
Figure 12C:
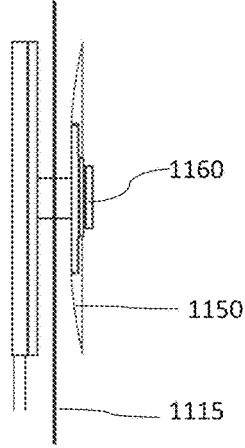

FIGS. 11A-11C are inside views and FIGS. 12A-12C are side views showing a process of attaching a lead to an inner lining 1115 of a garment. FIG. 11A shows inside the inner lining 1115 including a hole 1109. As shown in FIG. 11B, when attaching to the inner lining 1115, the smaller diameter disk being the front center 1116 is inserted into and through the hole 1109 so that the stem extends through the hole 1109 and the front center 1116 is inside of the inner lining 1115, and the back guard 1112, larger than the diameter of the hole 1109, is outside of the hole 1109. As shown in FIG. 11C, after the front center 1116 is through the hole 1109, the front guard 1150 is attached to the front center 1116, exposing the snap-on electrode 1160. This configuration allows the lead to float or move independently relative to the garment within the confines of the hole 1109. The combination of rotation and x-y movements is designed based on the findings of studying the movement of patches stuck to a garment versus patches stuck directly to the skin, where it was shown that patches attached to the skin experienced a wider range of x-y movement, as well as slight rotation relative to a garment. After the lead is attached to the garment and is connected to a patient's skin, the garment can move in the x-y direction with respect to the surface of the patient's skin when the patient moves, without disconnecting or interfering with the electrode's connection to the patient's skin.

FIGS. 12A-12C are side views showing the same attachment process as described with respect to FIGS. 11A-11C. FIG. 12A shows the lead including the back cap 1170, the back guard 112, and the wire 1180 before being connected to the inner lining 1115 of the garment. FIG. 12B shows the front center 1116 inserted through a hole in the inner lining 1115. FIG. 12C shows the front guard 1150 attached to the front center 1116, exposing the snap-on electrode 1160.

Figure 21A:
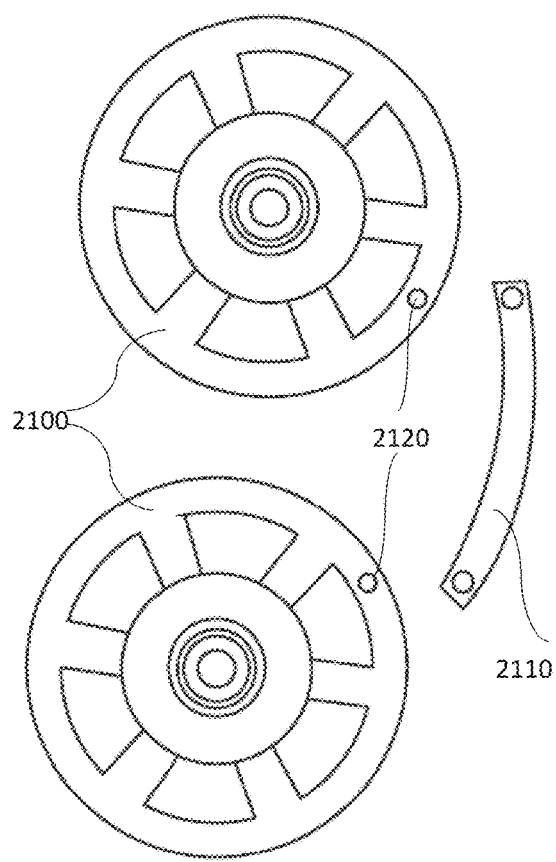
FIGS. 21A and 21B show a plastic strip between leads.
Figure 21B:
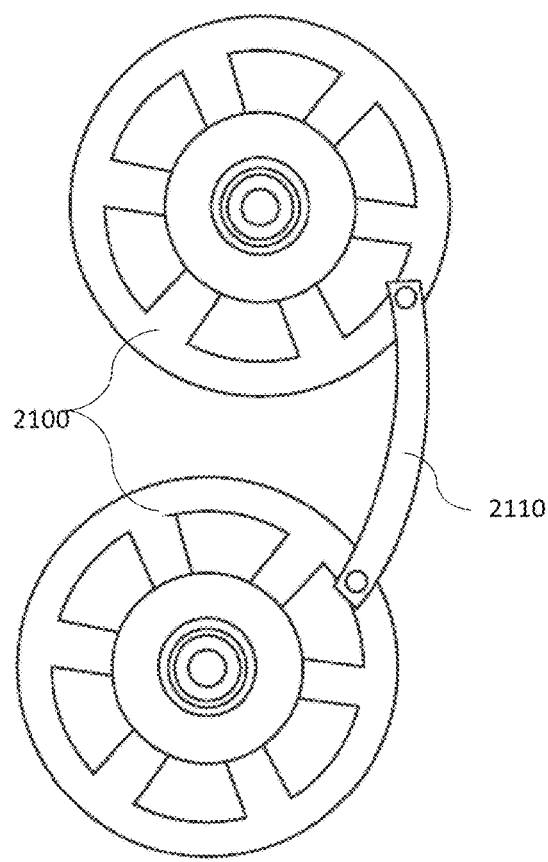

As shown in FIGS. 21A and 21B, the leads 2100 in the chest area can be connected with a thin strip 2110 of plastic to ensure a minimum distance is maintained between each other. This plastic strip 2110 can snap onto bumps 2120 on the bottom of the backing piece after the wired backing pieces have been threaded through the garment's channels.

Figure 13:
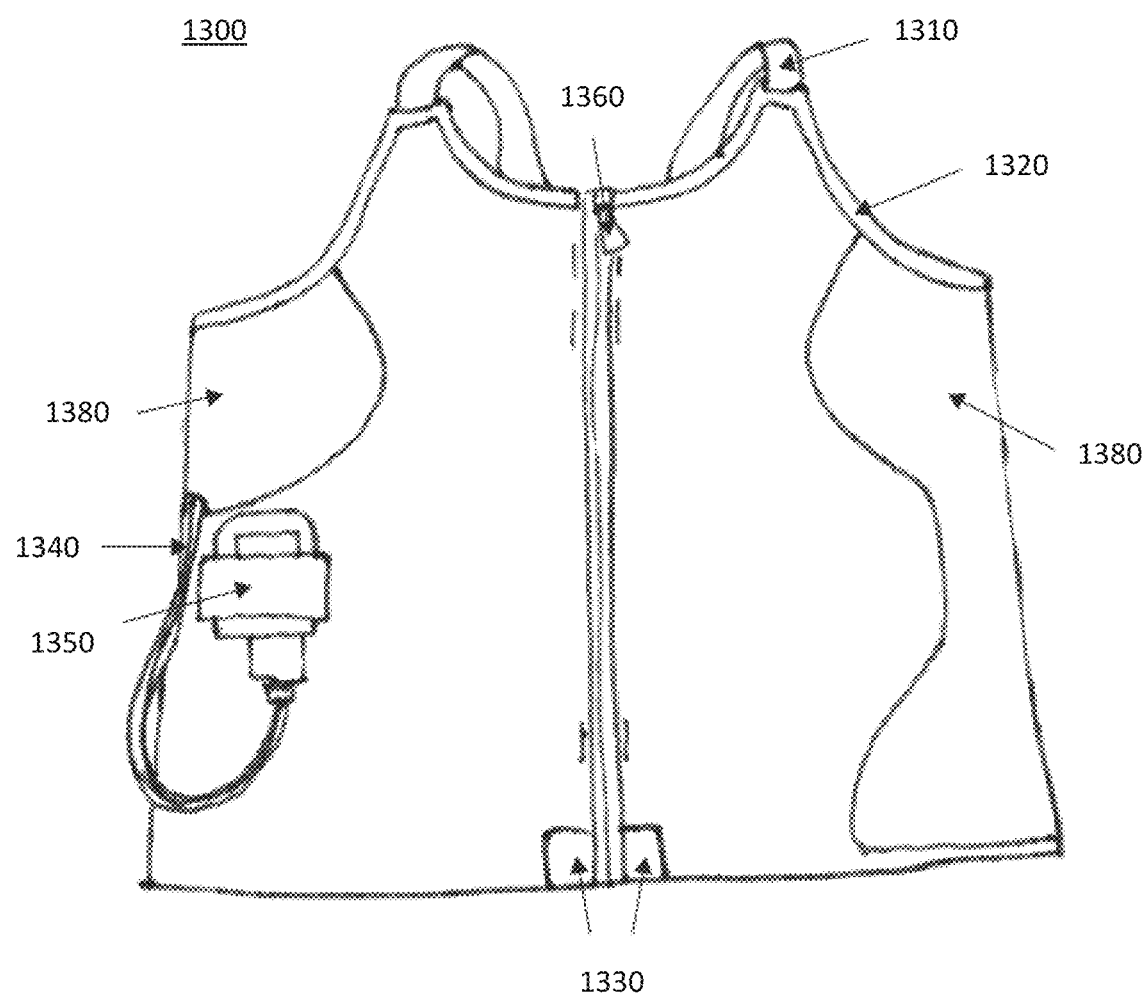
FIG. 13 shows a front view of a garment monitoring device with elastic straps according to a second preferred embodiment of the present invention.

FIG. 13 shows a front view of the outside of a garment 1300 according to a second preferred embodiment of the present invention. This preferred embodiment includes a stretch vest garment with an inner system of elastic straps. Several features depicted are similar to those previously described with respect to FIG. 1 and will not be repeated for brevity including the adjustable strap 1310, the stretch binding with soft hardware loop 1320, the zipper helpers 1330, the wires 1340, the sensor 1350, and the silicone pull tab 1360. However, this preferred embodiment includes a wire pocket 1380 used to install the electrodes and route wires 1340 between the electrodes and the sensor 1350. As with the sensor discussed above, the sensor 1350 can communicate wirelessly with a monitoring device to communicate information concerning the patient, which can then be transmitted to a remote monitoring location.

Figure 14:
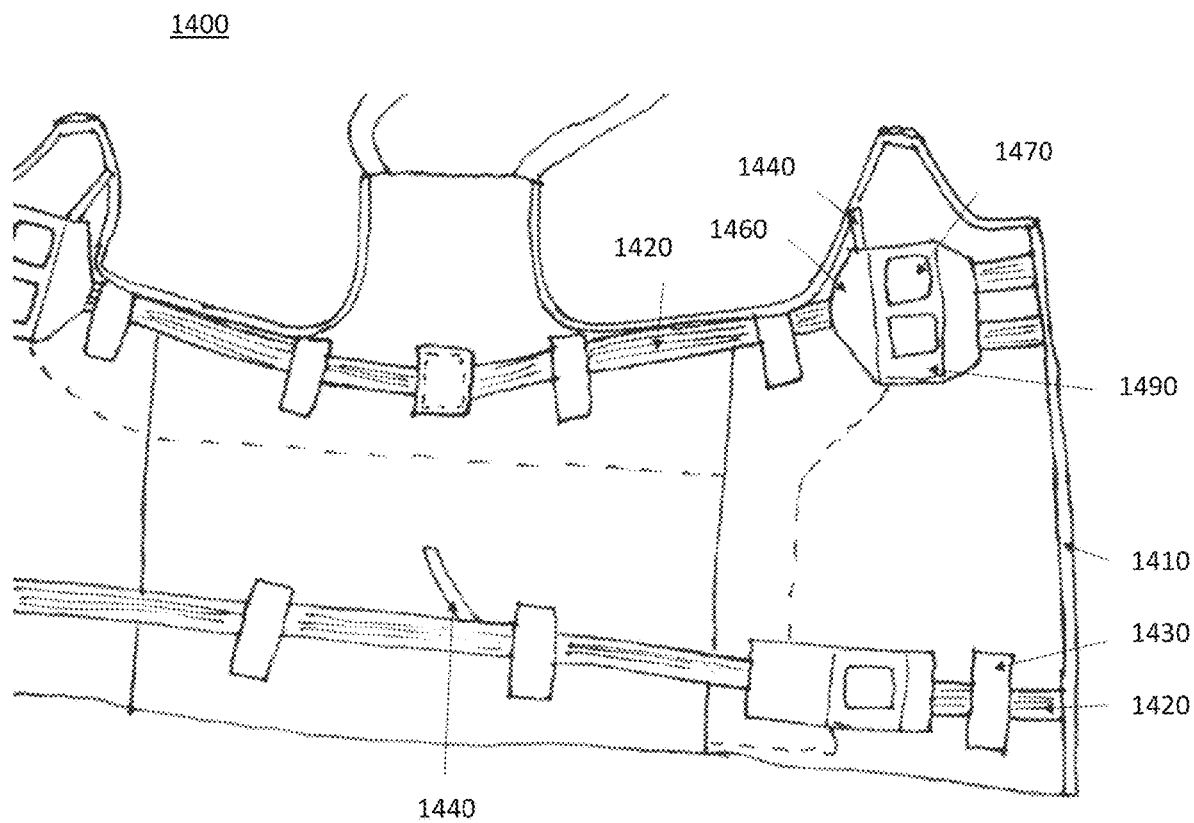
FIG. 14 shows an inside view of a lining for the garment monitoring device of FIG. 13.

FIG. 14 is an inside view with the zipper 1410 unzipped and the garment 1400 open to show electrodes 1470 on fabric patches 1460 backed by elastic straps 1420. As shown, the elastic straps 1420 extend along the chest and waist areas of the garment 1400. The elastic straps 1420 holding the fabric patches 1460 are made of a plush elastic in order to reduce chafing and increase patient comfort. One end of the elastic straps 1420 are secured to the garment adjacent to the zipper 1410 and then are routed and held in position with oversized carriers 1430 and suspender strips 1440 that define loops on the inside of the garment 1400 and that allow the elastic straps 1420 to pass through. The elastic straps 1420 are also connected to the fabric patches 1460 including the electrodes 1470 and are loosely connected to the garment 1400 to allow independent movement so that the electrodes 1470 will not be forced out of position caused by patient movement relative to the garment 1400. The electrodes 1470 can be any suitable material, including, for example, carbon rubber, conductive elastomer such as rubber with conductive filler particles, and woven cloth with a weave that includes a conductive component. The surface of the electrode 1470 can be tacky so that the pressure from the garment keeps the electrode 1470 in place on the patient's skin. The fabric patches 1460 can include grip surface 1490 that grips the patient's skin to help prevent or minimize movement of the electrodes 1470 with respect to a patient's skin. The grip surface 1490 keeps the electrode 1470 from sliding across the patient's skin, but a conductive or electrolyte material such as a spray or a gel can be used to ensure proper signal conduction from the patient's skin. The grip surface 1490 can be any suitable tacky surface. In addition to or instead of grip surface 1490, the surface of the electrode 1470 can be textured, e.g., raised bumps, to help grip the patient's skin.

Figure 15:
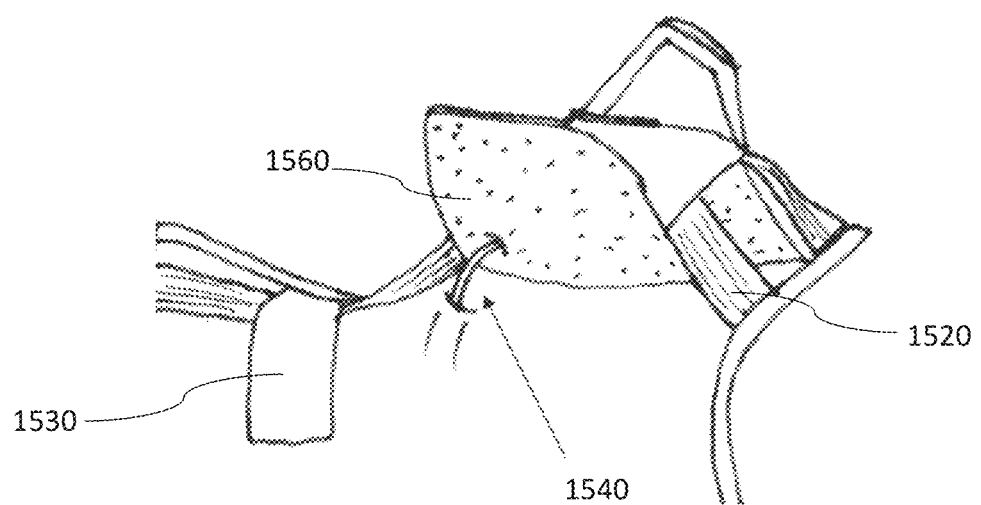
FIG. 15 shows a view of the underside of a fabric patch.

FIG. 15 shows a view of the underside of a fabric patch 1560 retained by an elastic strap 1520 routed through a carrier 1530 that reveals routing of a wire 1540 that exits a rear of the fabric patch 1560 and enters the garment and is further routed in a wire pocket to a sensor. As with the sensors discussed above, the sensor can communicate wirelessly with a monitoring device to communicate information concerning the patient, which can then be transmitted to a remote monitoring location.

FIGS. 16A-16C and 17A-17C show a preferred construction of an electrode assembly within a fabric patch. As shown, the fabric patch includes two electrodes that can be used in a patient's chest area, but can be constructed with any other number of electrodes. This assembly is sewn to the fabric patch, with only the electrode rubber being visible on the skin-contact side, and the wire(s) protruding out the other side and through a hole into the garment's channel or pocket. The fabric patch can be multilayer. The fabric patches can be fabricated with a material that grips the patient's skin so that, when a patient moves, the fabric patch moves with the patient's skin. Patients can be supplied with a liquid solution to spray directly onto each electrode once daily when donning the garment. This spray conditions and hydrates the skin, while improving conductivity with the rubber of the electrode.

Figure 16A:
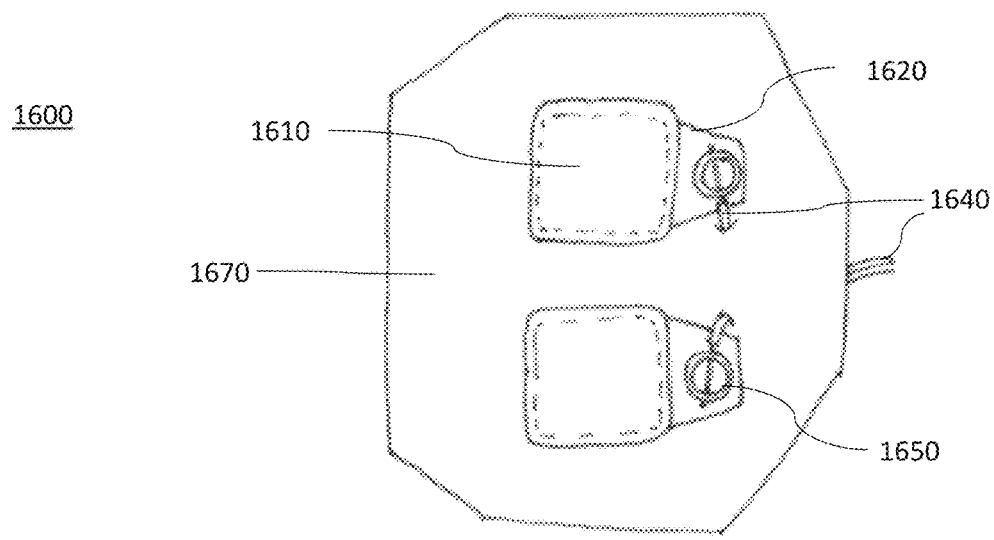
FIGS. 16A-16C and 17A-17C show a preferred construction of an electrode assembly within a fabric patch.
Figure 16B:
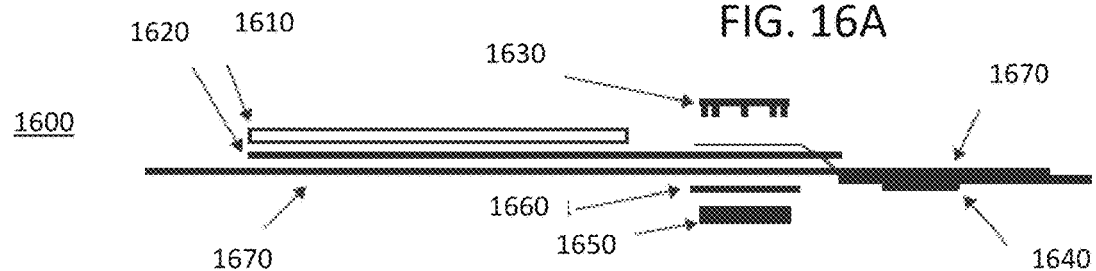
Figure 16C:
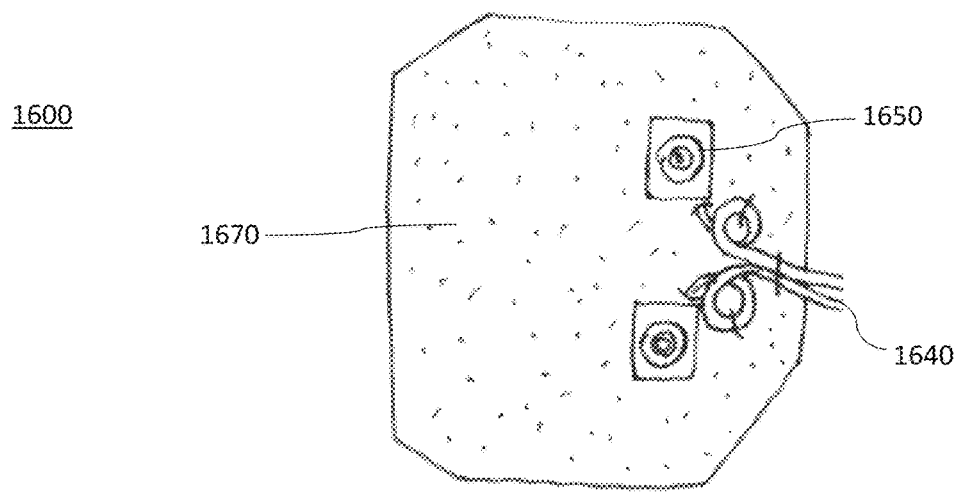

FIG. 16A is a front view, FIG. 16B is an exploded side view, and FIG. 16C is a rear view of a partially completed fabric patch 1600 without covering fabric. The electrode includes a piece of conductive rubber 1610, conductive fabric 1620, and antistatic fabric 1670. As shown in FIG. 16A, the conductive rubber 1610 and the conductive fabric 1620 can be sewn together, but the conductive rubber 1610 and the conductive fabric 1620 can be connected in suitable manner. Instead of conductive rubber 1610, other conductive materials can also be used, including, for example, carbon rubber, other conductive elastomers, and woven cloth with a weave that includes a conductive component. The conductive fabric 1620 can include a tab on one side with the conductor of the wire 1640 being crimped in a metal snap 1650 through the tab of the conductive fabric 1620. As shown in FIG. 16B, a snap ring 1630 crimps the wire 1640 and the metal snap 1650 through the conductive fabric 1620, the antistatic fabric 1670, and a buffer or filler fabric 1660. The wire 1640 is routed through the conductive fabric 1620 and the antistatic fabric 1670 to be on the same side as the metal snap 1650. Instead of using snap ring 1630 and metal snap 1650, the wire 1640 can be connected to the conductive fabric 1620 in any suitable manner.

Figure 17A:
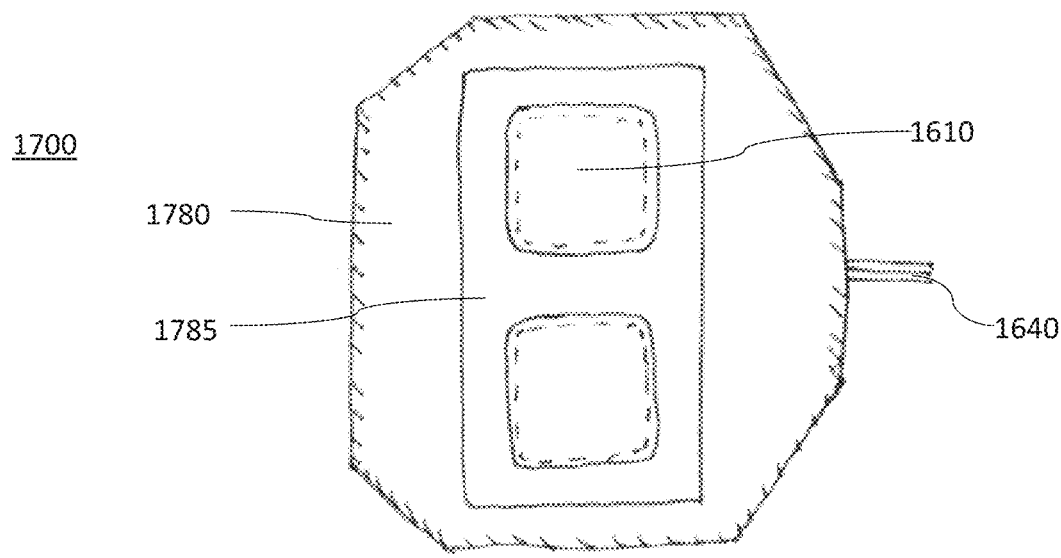
Figure 17B:
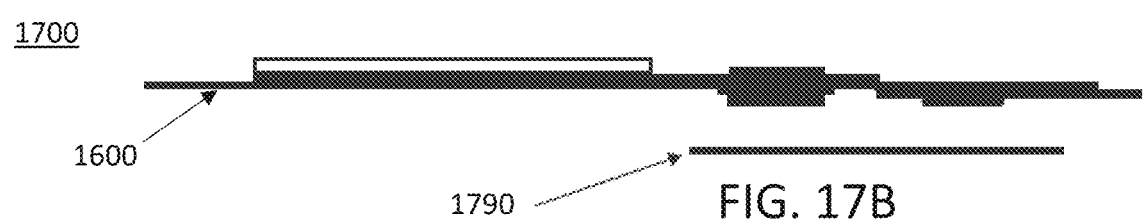
Figure 17C:
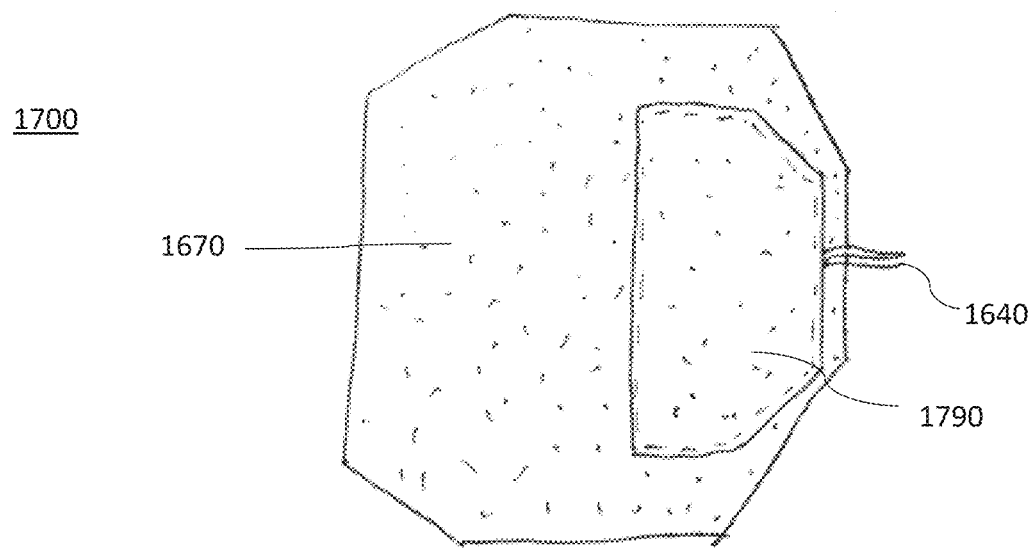

FIG. 17A is a front view, FIG. 17B is an exploded side view, and FIG. 17C is a rear view of the fabric patch 1600 of FIG. 16 with covering fabric that defines a completed fabric patch 1700. FIG. 17B shows that the covering fabric can include a cover fabric 1780 and a grip fabric 1785 that are sewn onto the inside of the electrode assembly and that antistatic fabric 1790 is sewn onto the outside to cover the metal snap 1650 and strain relief loop of the wires 1640. The cover fabric 1780 can be a soft cotton knit to be comfortable against the wearer's skin. The grip fabric 1785 can be a material that grips the wearer's skin to restrict sliding of the electrodes across their skin. For example, the grip fabric 1785 can be made from silicone grip or nanotech fabrics. Optionally, the grip fabric 1785 can be a surface treatment on the cover fabric 1780. Additionally, the grip fabric 1785 can include holes so that the conductive rubber is exposed after the covering fabric is applied.

Figure 18:
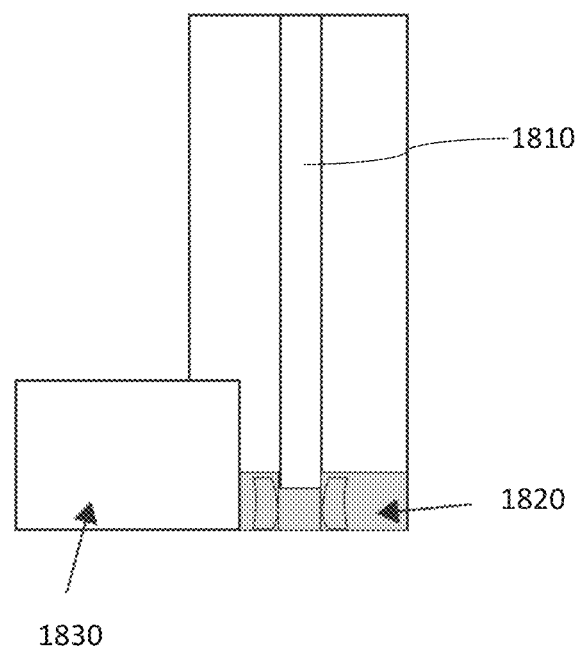
FIG. 18 shows a zipper helper.

FIG. 18 shows details of the zipper helpers similar to those shown in FIGS. 1 and 13. The zipper helpers are tabs on either side of the pin and barrel of the zipper 1810 that the patient can hold onto while guiding the pin into the barrel, making it possible to zip the garment without excessive pinching force on the hands. As shown from the inside, although only one is shown, both zipper helpers includes a thicker fabric swatch 1830, preferably an ⅛" thick neoprene rubber, behind a thinner plastic swatch 1820, which is a portion of the zipper 1810. The fabric and plastic swatches 1830, 1820 can be put together after the zipper 1810 is installed in the garment, but before the garment is hemmed. As seen, the fabric swatch 1830 overlaps the zipper tape and makes firm contact with the plastic swatch 1820. The fabric and plastic swatches 1830, 1820 can be attached or fused together with an adhesive and then covered over with the hem of the garment to secure all of the components together.

Figure 19:
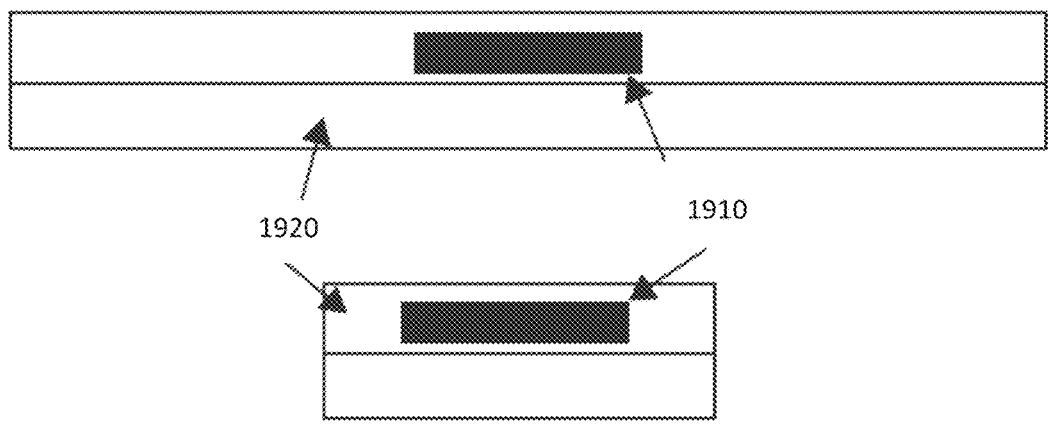
FIGS. 19 and 20 show a soft-ware loop.
Figure 20:
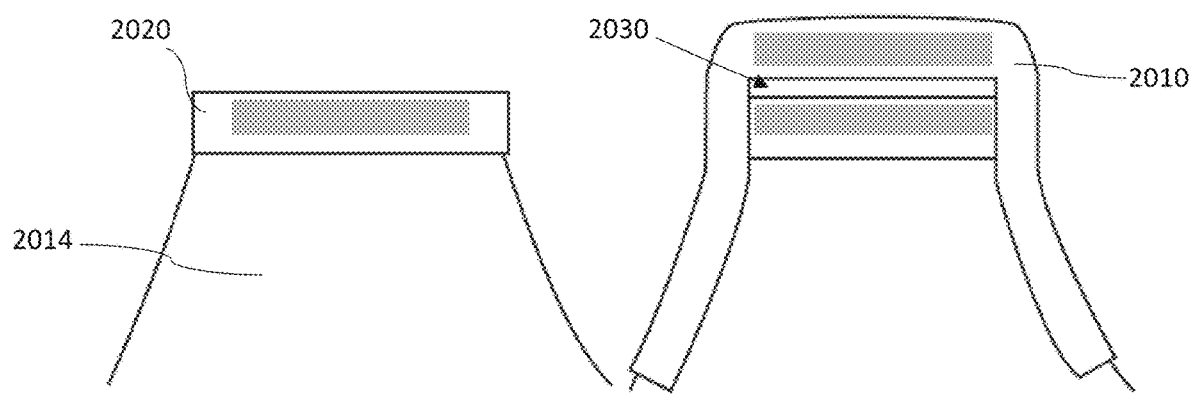

Loops of other garments created to feed a shoulder strap through for fit adjustment are not reinforced in any way, allowing both the strap and the top of the bodice to bunch up, potentially creating a point of discomfort for the wearer. FIGS. 19 and 20 are construction diagrams of a soft-ware loop used on garments of preferred embodiments to feed through the fit-adjusting shoulder straps that prevent or help alleviate creating a point of discomfort. FIG. 19 shows two components used to define the soft-ware loop that both include a flat plastic swatch 1910, preferably 1 mm thick, that is held in place with elastic 1920, preferably ⅝" wide, that is folded over the plastic piece. As shown, the elastic 1920 of first component at the top of FIG. 19 is longer than the second component at the bottom of the figure. As shown at the left side of FIG. 20, the shorter second component 2020 can be sewn into the front shoulder portion of the garment 2014. The right side of FIG. 20 shows that the longer first component 2010 can be sewn over the shorter second component 2020 to define a slot or loop 2030 in which a shoulder strap can be passed through and fastened. The rigid plastic pieces prevent a softer fabric-only loop from bunching up and causing patient discomfort.

FIGS. 22-36 are directed to a garment according to a third preferred embodiment of the present invention. The garment with ECG electrodes according to this preferred embodiment does not include any internal wiring. The lack of internal wiring results in a less expensive and more robust garment that can be repeatedly washed with no damage. The garment includes covers to protect externally mounted wires and to mitigate the risk of the wires being pulled, damaged, or disconnected from the electrodes during use.

The garment of this preferred embodiment does not have to include floating electrodes and operates with an external monitoring system, including existing monitoring system products. Thus, the garment works best with patients who are performing limited physical activity or are resting during recovery. For example, the garment with an external monitoring system can be used with patients doing computer work, reading, and walking around the house. One change to the patient experience is the addition of a step in the donning process. With the garment according to the third preferred embodiment, the right-side leads on the front of the garment are snapped into place after zipping up the vest.

Several features included in previously described preferred embodiments are also included in this third preferred embodiment and a detailed description of the same features will be omitted for brevity. Common features can include the outer shell, and features used to adjust fit and comfort, the zipper system, and materials.

Figure 22:
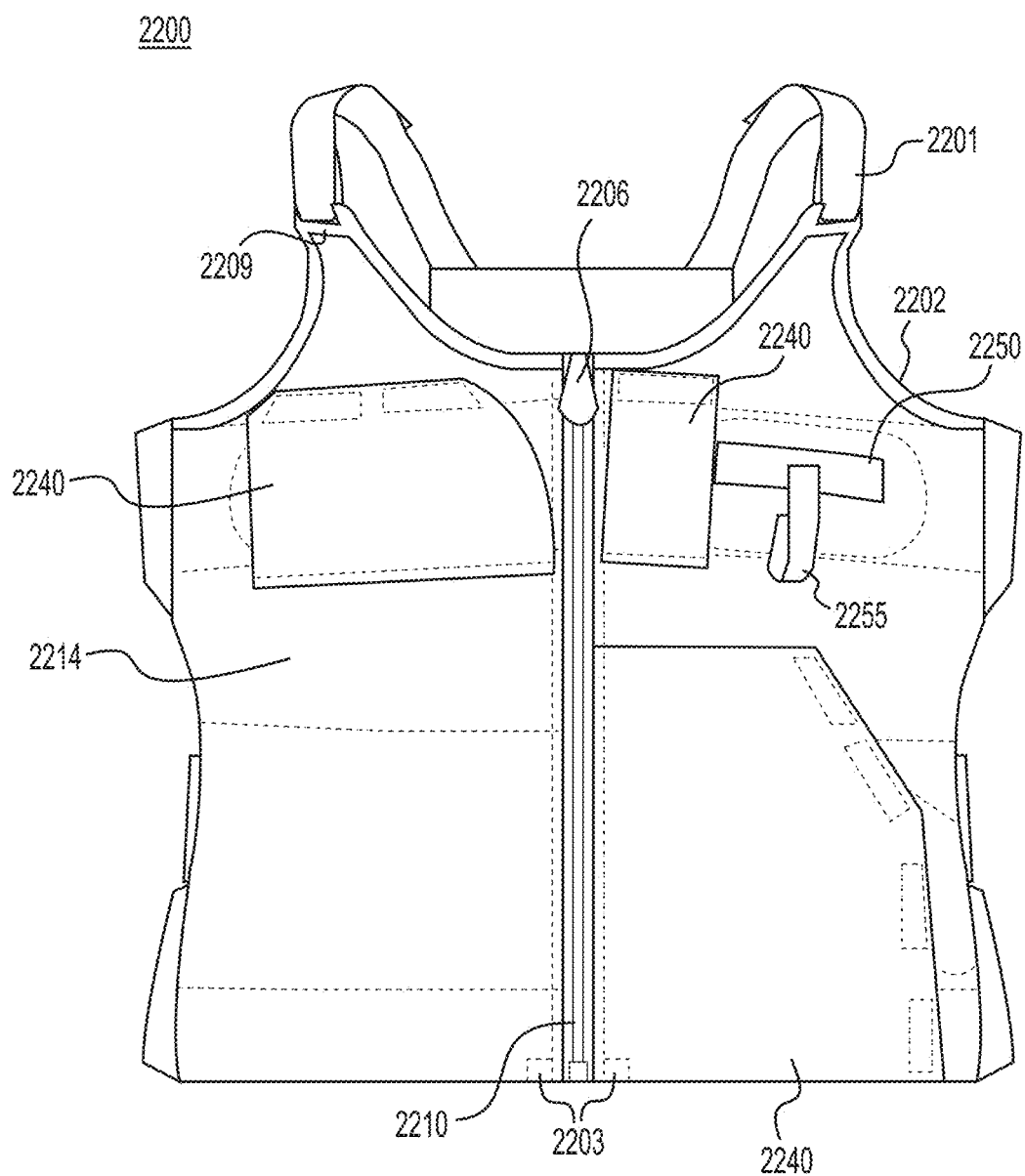
FIGS. 22 and 23 show front views of a garment monitoring device according to third preferred embodiment of the present invention.

FIG. 22 shows a front view of the outside of a garment 2200. FIG. 22 shows that the garment 2200 includes an outer shell 2214 that can be made from nylon or another suitable material.

As in previous preferred embodiments, FIG. 22 also shows two adjustable shoulder straps 2201 that fit over the shoulders of the patient and that can be used to adjust the fit of the garment 2200. As shown in FIG. 22, the arm holes can be bound by a stretch binding 2202 with a soft hardware loop 2209 where one of the shoulder straps 2201 extends through the soft hardware loop 2209. The garment 2200 can be opened and closed in the front with a full-length zipper 2210 that can include a pull-tab 2206 and zipper helpers 2203. FIG. 22 also shows wire covers 2240 and a sensor holder in the left chest area. The wire covers 2240 are connected to the outer shell 2214 and are used to protect routed wires, which are shown, for example, in FIG. 34. The sensor holder can include a laterally oriented elastic band 2250 that is attached to the outer shell 2214 at each end and a vertically oriented non-stretch band 2255 that is connected towards the center of the elastic band 2250 at one end and to the outer shell 2214 at the other end, although other configurations are possible.

Figure 23:
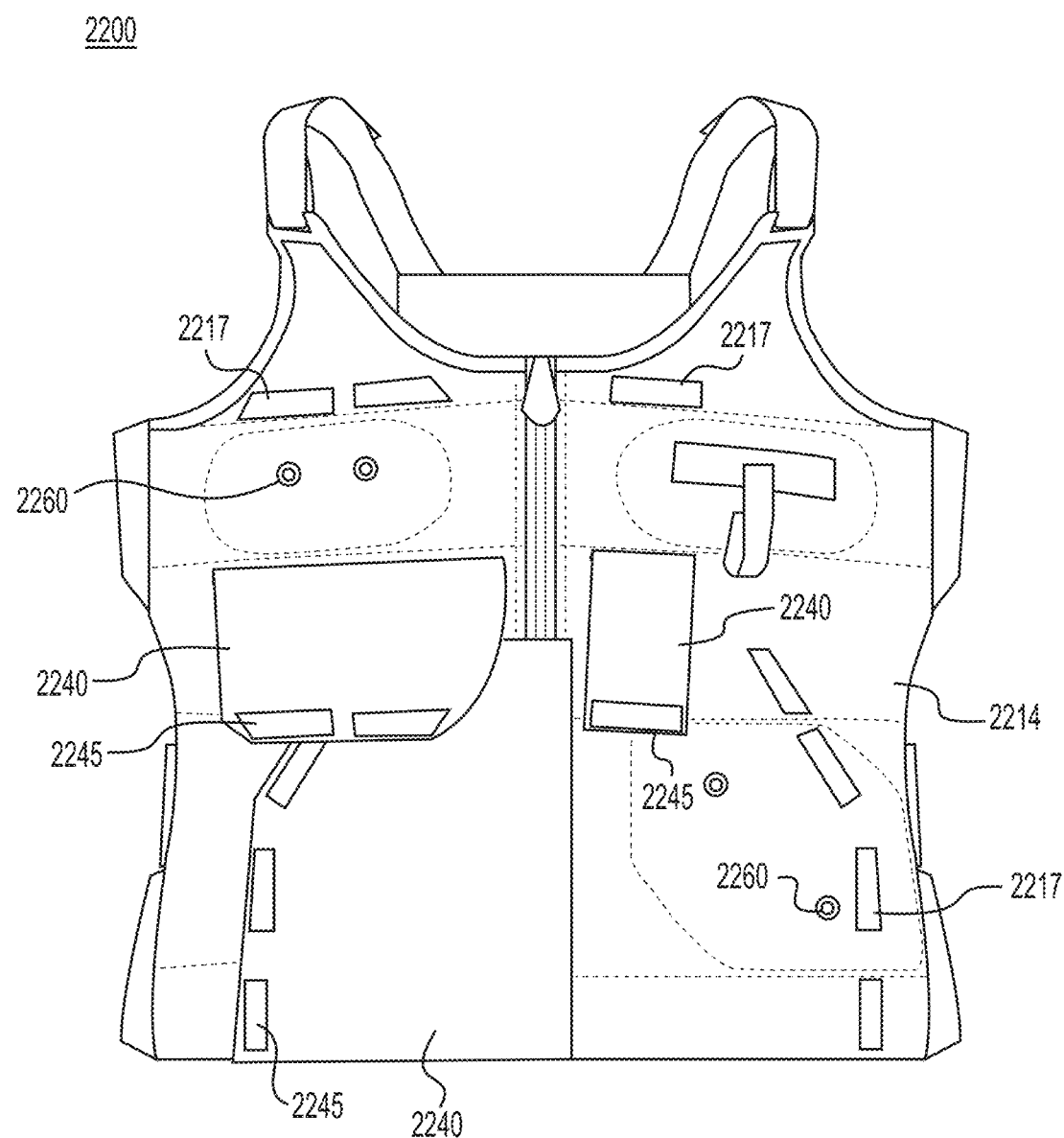

FIG. 23 is a front view of the outside of the garment 2200 shown in FIG. 22 with the wire covers 2240 open and exposing the inside and the portions of the outer shell 2214 underneath. FIG. 23 shows that the wire covers 2240 are attached to the outer shell 2214 on one side to create a hinge in which the wire covers 2240 can be rotated. The hinge in the wire covers 2240 can be created by sewing, bonding, or adhering an edge portion of each wire cover 2240 to the outer shell 2214. Alternatively, the wire covers 2240 can be configured to be entirely removable from the outer shell 2214 and made without a hinge.

As shown, the wire covers 2240 can be made of a cloth material that can include a hook-and-loop fastener 2245 on the inside that attaches to a mating hook-and-loop fastener 2217 that is attached to the outer shell 2214. The material of the wire covers 2240 can be the same as that used for the outer shell 2214 or of any other suitable material. FIG. 23 shows that some of the wire covers 2240 includes several hook-and-loop fasteners 2245. Alternatively, only one hook-and-loop fastener system can be used. Alternatively, the wire covers 2240 can be attached to the outer shell 2214 using buttons, a zipper, a buckle, a latch, or any other suitable structure.

FIG. 23 shows that opening the wire covers 2240 exposes electrode snaps 2260 that are located on the outer shell 2214 in the right chest and left hip areas. The electrode snaps 2260 are used to connect a mating snap on a lead wire from a sensor, as will be described below. Not shown are two electrode snaps located in the left chest area that are hidden by the bands of the sensor holder and are not covered by the wire covers 2240.

Figure 24:
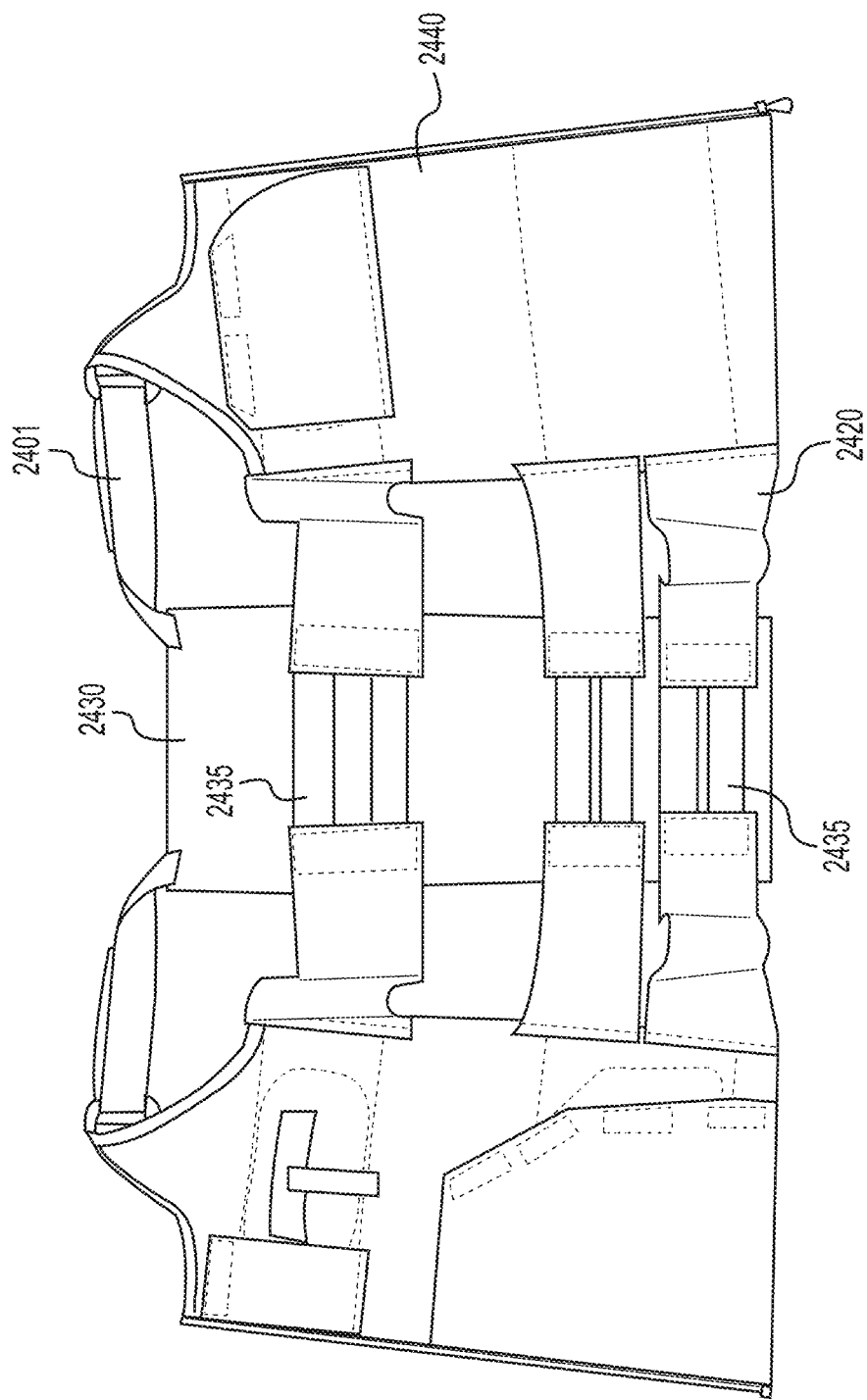
FIG. 24 shows a rear view of the garment of FIG. 22.

FIG. 24 is a rear view of the garment laid out with the front zipper unzipped. FIG. 24 shows a series of size-adjusting bands 2420 extending between the two front panels 2440 of the outer shell and a back panel 2430. The back panel 2430 can be a fabric connected to the adjustable shoulder straps 2401, and can include lengths of hook-and-loop fasteners 2435 that extend laterally across the back panel 2430. As shown, the size-adjusting bands 2420 are each attached to one front panel 2440 by sewing, bonding, adhering, or any other suitable method, and are also attached to the back panel 2430 by a mating hook-and-loop fastener located at ends of the size-adjusting bands 2420. In this manner, the garment can be adjusted to snugly fit a patient by easily moving the location of the ends of the size-adjusting bands 2420 relative to the back panel 2430. The size-adjusting bands 2420 can be made of or include an elastic material to allow the patient freedom of movement with comfort while wearing the garment. FIG. 24 shows six size-adjusting bands 2420, three on each side, but other numbers are possible. Alternatively, the garment can be cut and the size-adjusting bands 2420 configured to more closely fit the contours of women, as previously discussed.

Figure 25:
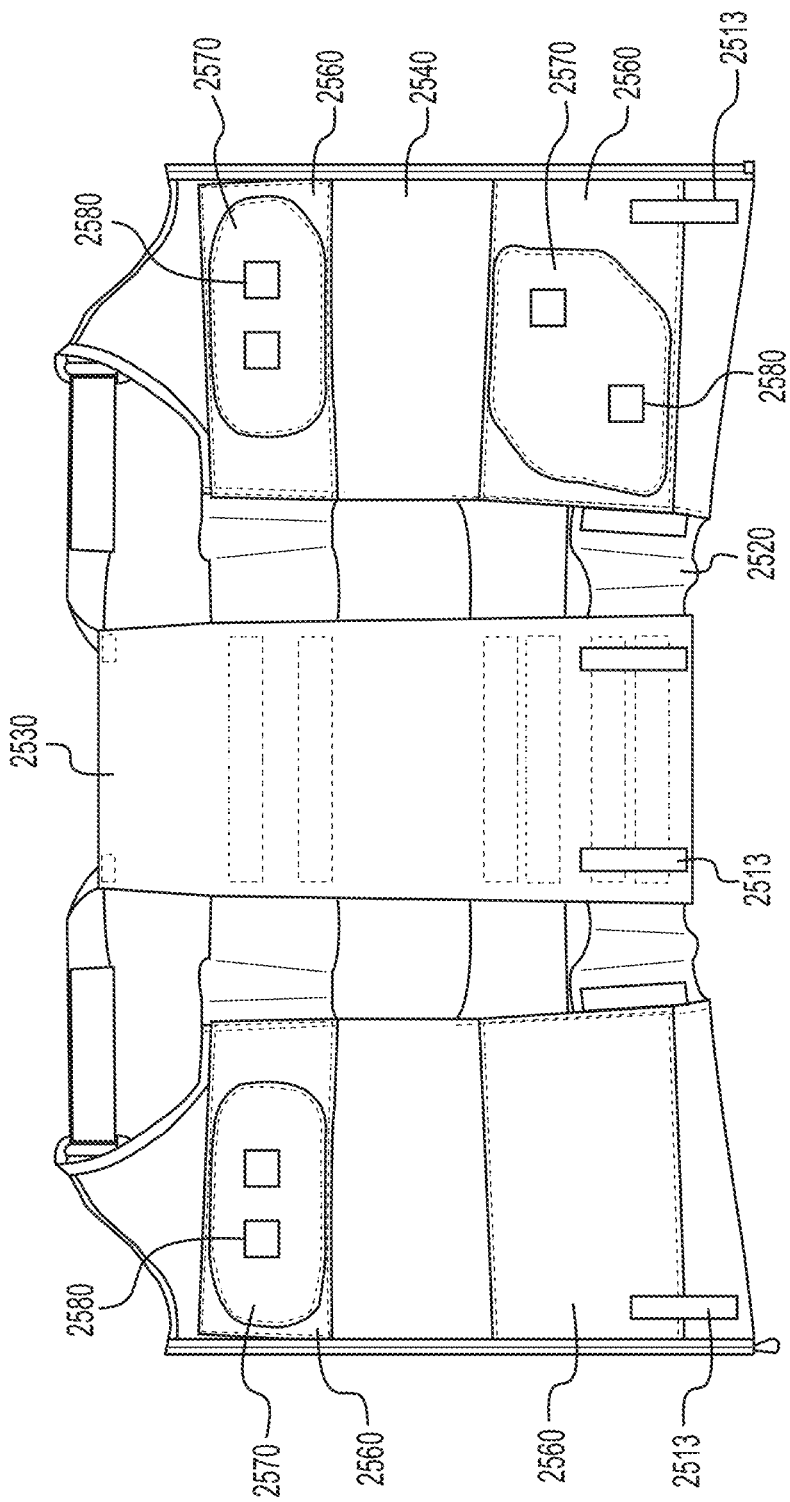
FIG. 25 shows a front inside view of the garment of FIG. 22.

FIG. 25 is a front inside view of the garment with the front zipper unzipped and exposing the inside of the self-adjusting straps 2520, the back panel 2530, and the front panels 2540. As shown, each of the front panels 2540 and the back panel 2530 can include grip strips 2513 that can include a layer of silicone that grips the skin of a user wearing the garment. Additionally, the front panels 2540 can include reinforcement panels 2560 that can be stretchable or non-stretchable and used to reinforce the outer shell and to support electrode assemblies within the garment. As discussed below, exposed portions of the electrode assemblies each include a bump fabric 2570 and a conductive rubber electrode 2580. The electrode assemblies can be located at the right chest, the left chest, and the left hip areas, or at any other suitable location within the garment.

Figure 26:
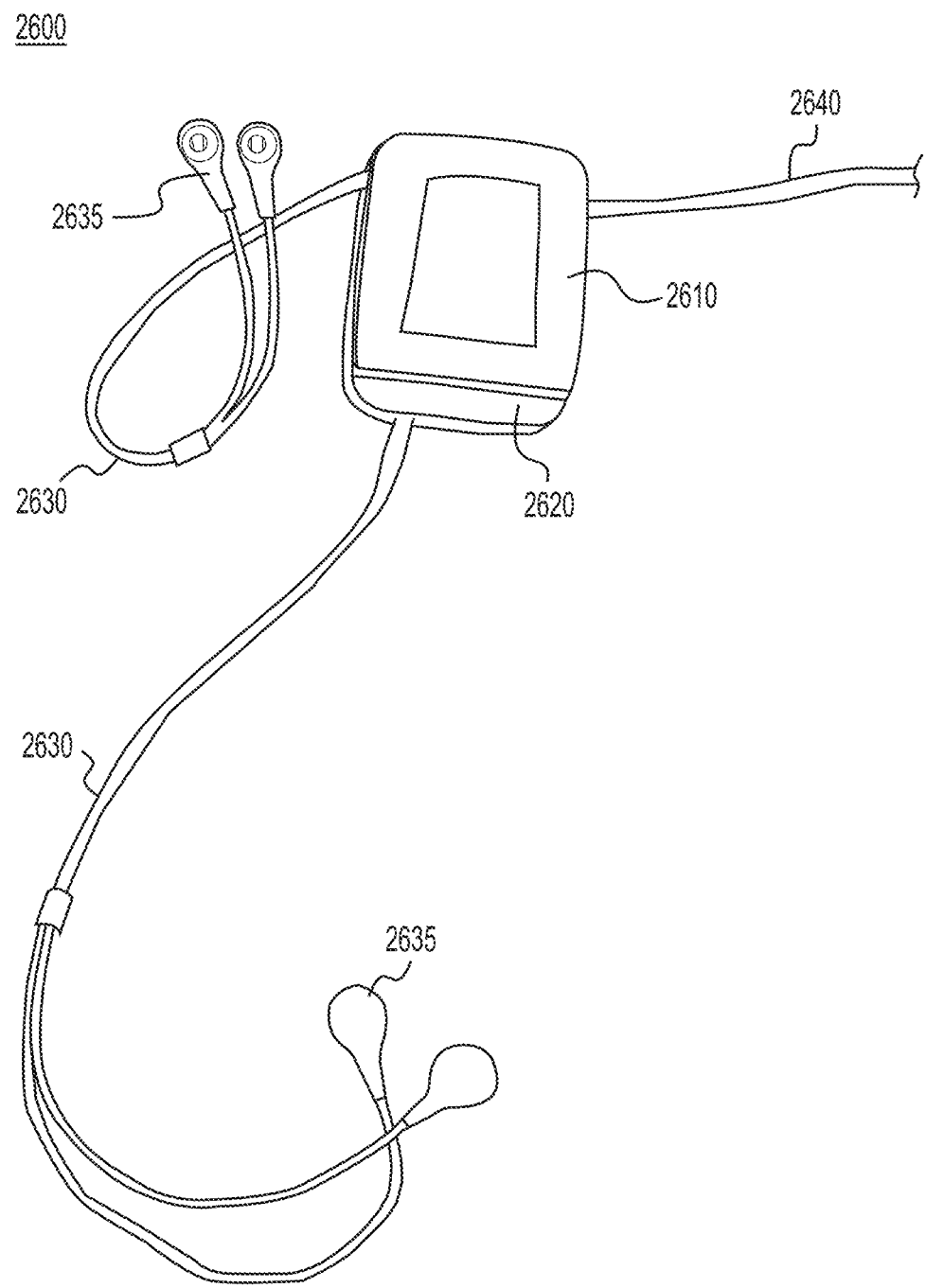
FIG. 26 shows a monitoring system usable with a garment.

FIG. 26 shows a monitoring system 2600 usable with a garment according to a preferred embodiment of the present invention, including the third preferred embodiment discussed above. As shown, the monitoring system 2600 can include a sensor 2610, an adapter 2620, ECG lead wires 2630, ECG lead snaps 2635, and an optional adapter lead 2640. As previously discussed, the monitoring system 2600 can be used in conjunction with a remote monitoring device to capture, transmit, record, analyze, and display a patient's physiological vital signs. Each of the sensor 2610, the ECG lead wires 2630, and the adapter lead 2640 can be plugged into and unplugged from or can be permanently attached to the adapter 2620. When a battery within the sensor 2610 is low, the sensor 2610 can be unplugged from the adapter 2620, and a new sensor 2610 can be plugged into the adapter 2620. The sensor 2610 can thus be replaced without disturbing the ECG lead wires 2630 and adapter lead 2640. The monitoring system 2600 can include the optional adapter lead 2640 that can connect to a finger or ear adapter used to measure pulse oximetry or another vital sign. The monitoring system 2600 of FIG. 26 can be attached to the garment 2200 of FIG. 22 using the ECG lead snaps 2635 and adapter snaps shown in FIG. 27A. The elastic band 2250 and the non-stretch band 2255 of the sensor holder are used to prevent the adapter 2620 from detaching and falling off the garment 2200 and to reduce stress on the adapter snaps due to holding the weight of the sensor 2610 and the adapter 2620.

Figure 27B:
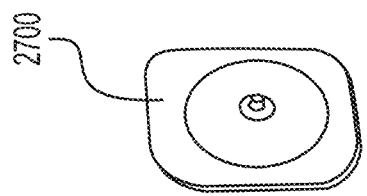
FIG. 27B shows a disposable electrode.
Figure 27A:
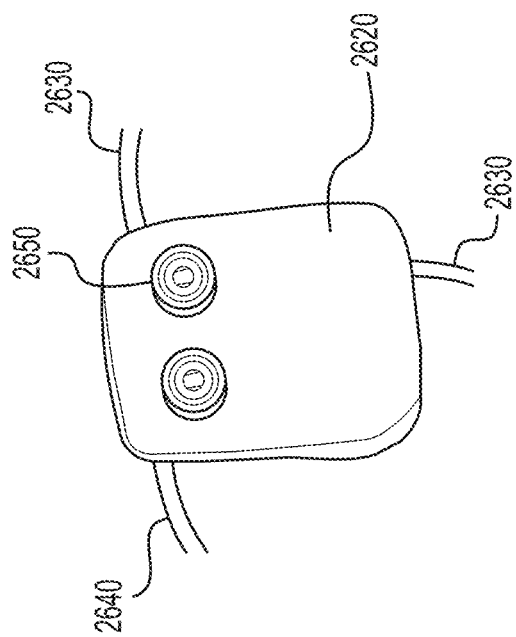
FIG. 27A shows a close-up rear view of the adapter shown in FIG. 26.

FIG. 27A is a close-up view of the opposite side of the adapter 2620 shown in FIG. 26. FIG. 27A shows the ECG lead wires 2630 and the adapter lead 2640. FIG. 27A also shows two adapter snaps 2650 on the adapter 2620. The adapter snaps 2650 on the adapter 2620 are similar to the ECG lead snaps 2635 in that they are both designed for use with a disposable, portable adhesive electrode like the electrode 2700 shown in FIG. 27B. Typically, disposable electrodes 2700 can be adhered to desired locations on a patient's skin, and the ECG lead snaps 2635 and the adapter snaps 2650 can be snapped to the disposable electrode 2700. As further discussed below, the snap connection on the disposable electrode 2700 is the same as those used on the lead snaps 2260 as shown on the garment in FIG. 23. Accordingly, the garment is configured so that it can be used with a monitoring system similar to the monitoring system 2600 as an alternative to using disposable electrodes 2700.

FIGS. 28A and 28B show a conductive rubber electrode 2800. FIGS. 28A and 28B respectively show a side view and a front view of conductive rubber electrode 2800 that includes a generally strip-shaped conductive fabric 2810 with a conductive rubber patch 2820 and a lead snap 2830 attached on the same side. The conductive fabric 2810 and the conductive rubber patch 2820 can be defined in any suitable shape and are not limited by the shapes shown in FIGS. 28A and 28B. As shown, the conductive rubber patch 2820 includes a semi-circular cutout to increase the distance between adjacent conductive rubber patches 2820 to avoid contact between them that would cause a short circuit.

FIGS. 29A and 29B respectively show a front view and a rear view of two conductive rubber electrodes 2800 attached between a bump fabric 2840 and a filler 2850. As shown in FIG. 29A, the conductive rubber patches 2820 are fit into respectively sized openings in the bump fabric 2840 to expose the conductive rubber patches 2820. FIG. 29B shows that the filler 2850 is located on the opposite side of the conductive rubber electrodes 2800 than where the bump fabric 2840 is located. The conductive rubber electrodes 2800, the bump fabric 2840, and the filler 2850 are joined together by sewing, bonding, adhering or any other suitable method. The filler 2850 can be made from a foam material that is thicker than the materials of the conductive fabric 2810 and the bump fabric 2840.

FIGS. 30-33 show a method of attaching a conductive rubber electrode to a garment. The lower halves of FIGS. 30-33 show a cross section view of an ECG electrode assembly mounted on the interior of a garment. As shown, a conductive rubber patch 3020 is attached to a conductive fabric 3010 and protrudes through one side of a bump fabric 3040. As shown, the conductive fabric 3010 is folded around a filler 3050 and positioned to align the lead snap 3025 to an appropriate location on the outer shell 3014. As shown, the lead snap 3025 is constructed of two snap pieces such that a snap post 3022 on the inside fits into a cavity in the snap stud 3024 on the outside, and when the two are pressed together, the snap post 3022 is crushed into the cavity through the fabric layers which makes contact between the snap pieces.

Each of FIGS. 30-33 show an inside view and a cross-section view of a right front panel 3030 of the garment. FIGS. 30-33 show the front panel 3030, an adjustable shoulder strap 3001, a reinforcement panel 3060, two pieces of conductive fabric 3010, a bump fabric 3040, a filler 3050, and a rubber patch 3020 corresponding to each of the pieces of conductive fabric 3010.

In FIG. 30, an assembly including the two pieces of conductive fabric 3010, the conductive rubber patches 3020, the bump fabric 3040, and the filler 3050 are oriented in a position on the inside of the right front panel 3030 of the garment. FIG. 31 shows that a hole for each lead snap extends through the layers of fabric including the conductive fabric 3010, the reinforcement panel 3060, and the outer shell 3014 along the axis represented by the dotted line. FIG. 32 shows that a snap post 3022 for each lead snap extends respectively through the aligned holes in the conductive fabric 3010, the reinforcement panel 3060, and the outer shell 3014. FIG. 32 also shows that a snap stud 3024 is placed over each of the snap posts 3022 which are then squeezed together to crush the snap posts 3022 into the snap studs 3024 creating a mechanical attachment between them to define a lead snap 3025.

FIG. 33 shows that the two conductive rubber patches 3020, along with the bump fabric 3040 and the filler 3050, are folded upward, and the bump fabric 3040 is attached to the reinforcement panel 3060. The bump fabric 3040 can be attached to the reinforcement panel 3060 by sewing, bonding, adhering or any other suitable method. After the bump fabric 3040 is attached to the reinforcement panel 3060, the two conductive rubber patches 3020 are exposed inside the garment.

Figure 34:
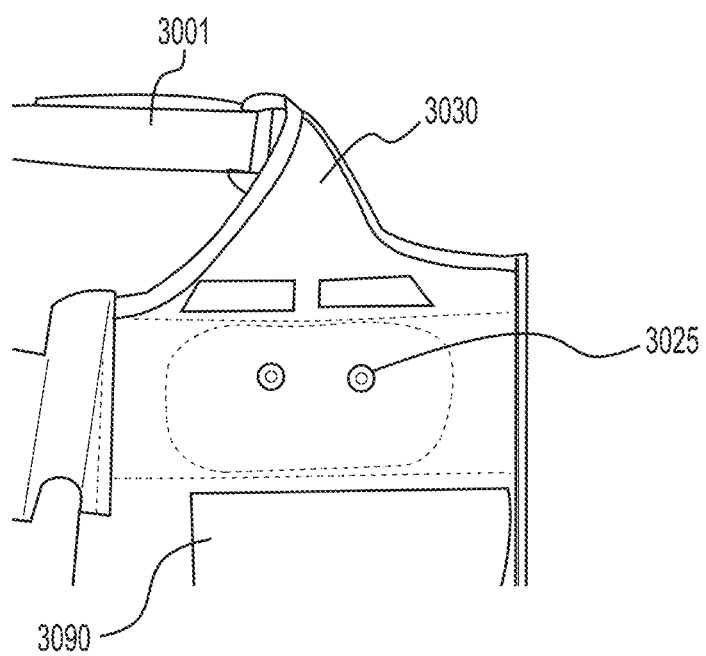
FIG. 34 shows an outside view of the right front panel of the garment.

FIG. 34 is an outside view of the right front panel 3030 of the garment showing the adjustable shoulder strap 3001 and the open right-side wire cover 3090 and exposing the two lead snaps 3025.

Figure 35:
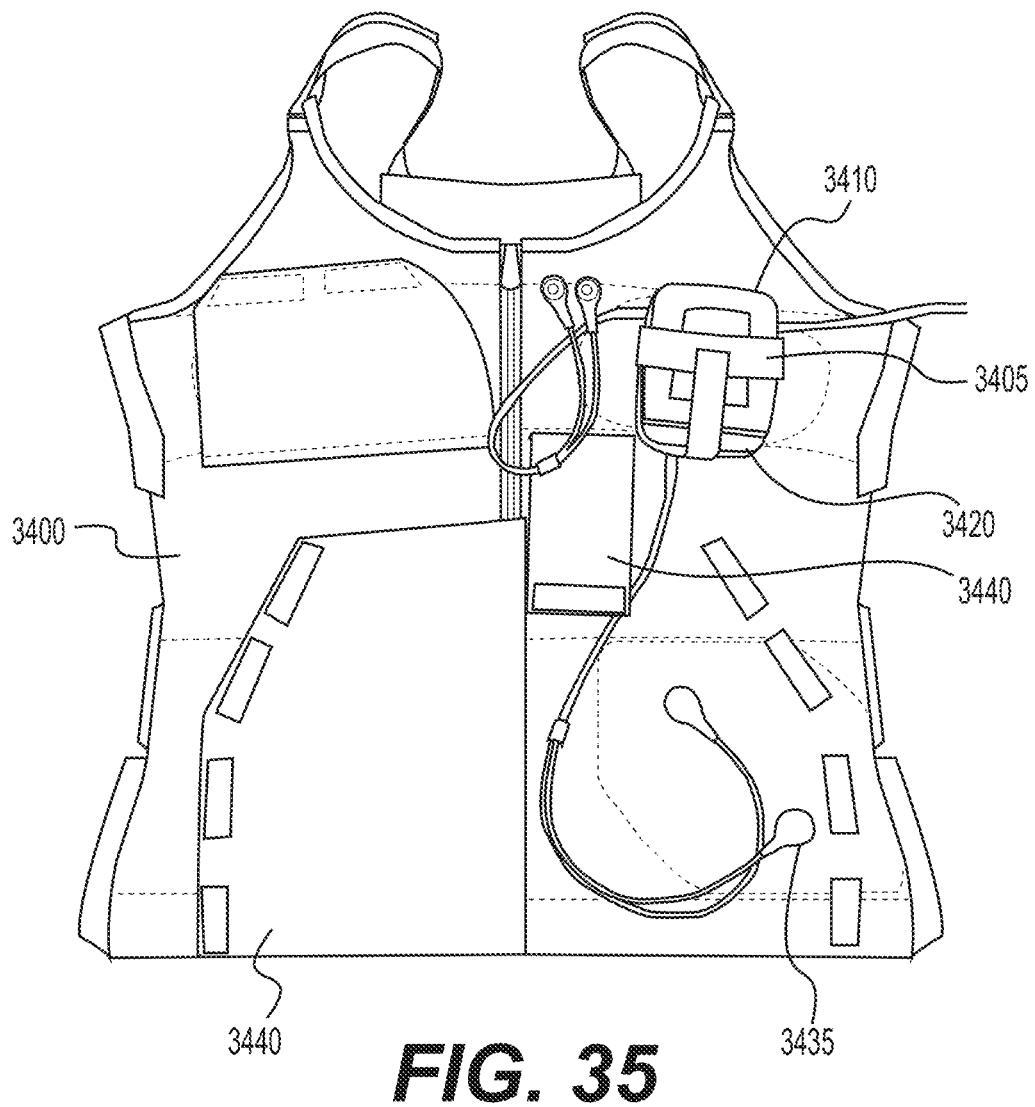
FIGS. 35-37 show steps in a method of donning the garment with ECG electrodes.
Figure 36:
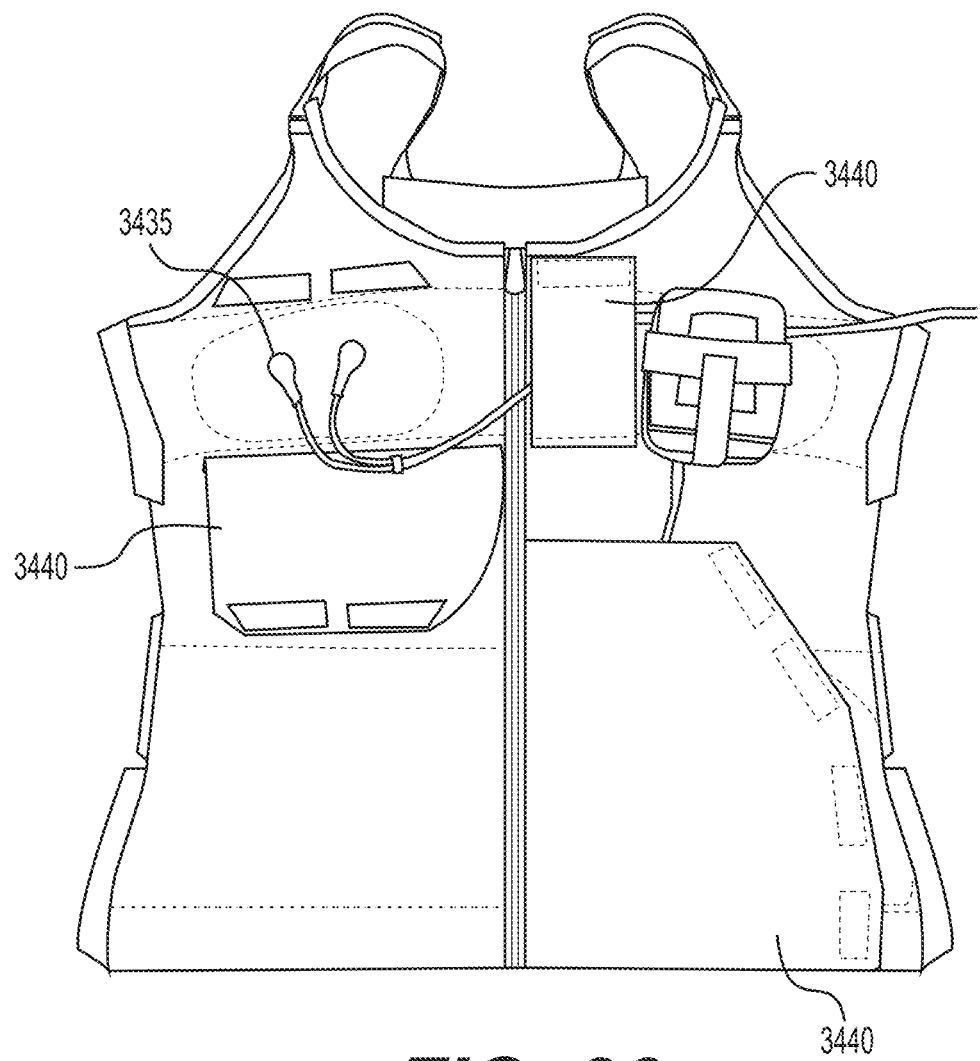
Figure 37:
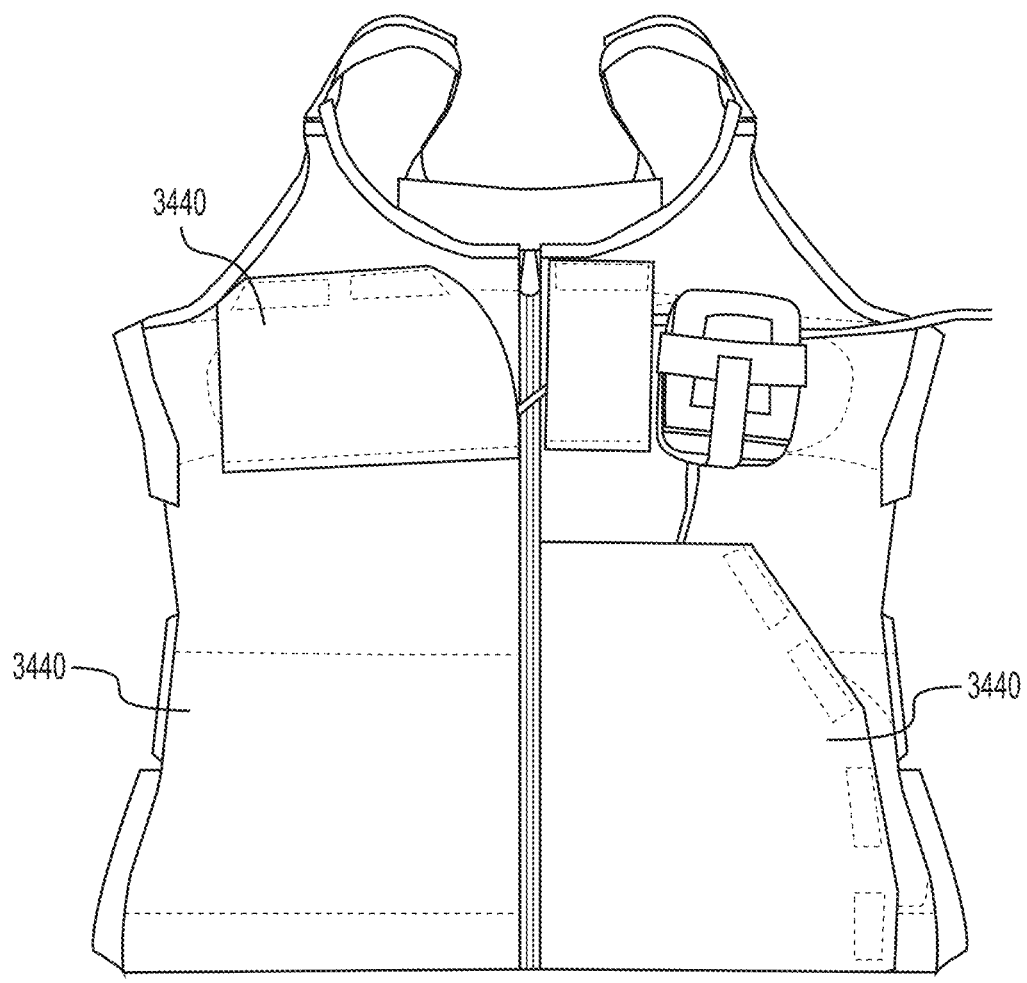

FIGS. 35-37 show steps in a method of donning the garment with ECG electrodes. Once a garment is selected, a monitoring system can be attached to the garment. FIG. 35 shows a garment 3400 like that shown in FIGS. 22 and 23 with a sensor 3410 and adapter 3420 inserted in the sensor holder 3405. The adapter snaps are snapped into the electrode snaps of the garment in the left chest area. As shown, the wire covers 3440 on the left side of the garment are opened, and two of the ECG lead snaps 3435 are snapped onto two of the electrode snaps in the left hip area. A conductive or electrolyte spray or gel is applied to the conductive rubber electrodes on the inside of the garment. The garment is placed on the patient, the zipper is closed, and the size-adjusting bands are adjusted for a snug fit to ensure contact of the conductive rubber electrodes to the patient's skin.

As shown in FIG. 36, the two left-side wire covers 3440 are closed to cover the wires in the left chest area and the wires and the ECG lead snaps 3435 in the left hip area. FIG. 36 also shows that the wire cover 3440 in the right chest area is opened, corresponding lead wires are extended from the adapter 3420 across the zipper, and the two of the corresponding ECG lead snaps 3435 are snapped onto the two electrode snaps. Once, all ECG lead snaps 3435 are snapped into place onto their corresponding electrode snaps, all wire covers 3440 are closed, and the garment is prepared for use, as shown in FIG. 37.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:
1. A garment comprising:
a lining with a hole;
a lead held within the hole; and
a wire connecting the lead to a sensor; wherein
the lead is held within the hole such that the lead is able to move in an x-y direction and rotate within the hole when the garment is worn by a user such that the lead is in contact with the user's skin,
the lead includes:
a backing piece;
a back cap attached to a rear of the backing piece;
a snap-on electrode attached to a front of the backing piece that contacts the user's skin; and
a front guard attached to a front of the backing piece behind the snap-on electrode, and the snap-on electrode includes a transducer that changes pulsating electrical waves from the user's skin into an electrical signal.

2. The garment of claim 1, wherein
the backing piece is larger than the hole;
the front guard is larger than the hole; and
a stem extends through the hole and connects the backing piece and the front guard.

3. The garment of claim 1, further comprising:
another hole adjacent to the sensor; and
a channel that is located between the hole and the another hole; wherein
the wire extends through the channel.

4. The garment of claim 1, further comprising a zipper that extends from a top to a bottom at a front of the garment, wherein
the zipper includes first and second pull tabs located on opposite sides of a bottom of the zipper, and
the first and second pull tabs each include plastic and fabric swatches.

5. The garment of claim 1, further comprising:
a cutout at a rear of the garment; and
an adjustment area under the cutout and above a bottom hem line of the garment used to adjust garment fit at a waist area of the garment.

6. The garment of claim 1, further comprising:
a cutout at a chest area adjacent to a top portion of a front zipper; and
a cutout at a waist area.

7. The garment of claim 1, wherein
the lead transmits a signal from a body of a user wearing the garment, and
the signal is an electrocardiogram (ECG) signal.

8. The garment of claim 1, further comprising additional leads, wherein
the additional leads and the lead are arranged such that some of the additional leads and the lead are located at a chest area of the garment and some of the additional leads and the lead are located at a waist area of the garment.

9. The garment of claim 1, wherein the backing piece includes:
a stem that is hollow;
a back guard that is attached to a rear of the stem; and
a front center that is smaller in area than the back guard.

10. The garment of claim 9, further comprising a snap attached to a front of the front center and electrically connected to a wire that extends through the stem; wherein
the snap-on electrode is attached to the snap.

11. The garment of claim 10, wherein the snap-on electrode is rotatable or movable relative to the snap.

12. The garment of claim 9, wherein
the front center fits through the hole in the lining of the garment in which the back guard does not fit through, and
the lead is free to move independently relative to the garment.

* * * * *